US 9,190,802 B2

(12) United States Patent
Miyato et al.

(10) Patent No.: US 9,190,802 B2
(45) Date of Patent: Nov. 17, 2015

(54) OPTICAL FIBER LASER EQUIPMENT

(71) Applicant: FURUKAWA ELECTRIC CO., LTD., Tokyo (JP)

(72) Inventors: Taizo Miyato, Tokyo (JP); Kosuke Kashiwagi, Tokyo (JP); Yoshihiro Emori, Tokyo (JP); Akira Fujisaki, Tokyo (JP); Koji Kajiwara, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 14/598,691

(22) Filed: Jan. 16, 2015

(65) Prior Publication Data

US 2015/0214692 A1   Jul. 30, 2015

Related U.S. Application Data

(63) Continuation of application No. PCT/JP2013/069553, filed on Jul. 18, 2013.

(30) Foreign Application Priority Data

Jul. 18, 2012  (JP) .................................. 2012-159937

(51) Int. Cl.
*H01S 3/30* (2006.01)
*H01S 3/102* (2006.01)
(Continued)

(52) U.S. Cl.
CPC ............... *H01S 3/1022* (2013.01); *H01S 3/067* (2013.01); *H01S 3/06716* (2013.01);
(Continued)

(58) Field of Classification Search
CPC ... H01S 3/067; H01S 3/06754; H01S 3/1305; H01S 3/094053; H01S 3/094003
USPC .................................................. 372/6, 29.011
See application file for complete search history.

(56) References Cited

U.S. PATENT DOCUMENTS 5,589,089 A   12/1996  Uesugi
8,811,434 B2 *  8/2014  Miyato et al. .................... 372/6
(Continued)

FOREIGN PATENT DOCUMENTS

JP    62-008748 A    1/1987
JP    07-116878 A    5/1995
(Continued)

OTHER PUBLICATIONS

International Search Report mailed Oct. 1, 2013 for PCT/JP2013/069553 filed Jul. 18, 2013 with English Translation.
(Continued)

*Primary Examiner* — Kinam Park
(74) *Attorney, Agent, or Firm* — Oblon, McClelland, Maier & Neustadt, L.L.P.

(57) ABSTRACT

An optical fiber laser device includes optical reflectors making an invisible laser light from an amplification optical fiber; a light source outputting a visible light; an introduction unit outputting the laser light input to a first input terminal from a first output terminal mainly, outputting the visible light input to a second input terminal from the first output terminal mainly, inputting the visible light output by the light source connected to the second input terminal and introducing the visible light to the amplification optical fiber or a output optical fiber via the first output terminal; an optical multiplexer/demultiplexer outputting the visible light to the introduction unit, and outputting a leaking return light input from a side of the introduction unit; and a controller outputting the visible light from the output optical fiber in a case of determining a position at which the laser light will be irradiated.

17 Claims, 15 Drawing Sheets

(51) Int. Cl.
  *H01S 3/067* (2006.01)
  *H01S 3/0941* (2006.01)
  *H01S 3/094* (2006.01)
  *H01S 3/16* (2006.01)
  *H01S 3/13* (2006.01)

(52) U.S. Cl.
  CPC .......... *H01S 3/06754* (2013.01); *H01S 3/0941* (2013.01); *H01S 3/094003* (2013.01); *H01S 3/094053* (2013.01); *H01S 3/1305* (2013.01); *H01S 3/1608* (2013.01); *H01S 3/1618* (2013.01)

(56) References Cited

U.S. PATENT DOCUMENTS

2006/0182383 A1* 8/2006 Slotwinski .................. 385/12
2013/0299474 A1* 11/2013 Kashiwagi et al. ...... 219/121.81

FOREIGN PATENT DOCUMENTS

JP   2005-013348 A   1/2005
JP   2013-102007 A   5/2013

OTHER PUBLICATIONS

International Written Opinion mailed Oct. 1, 2013 for PCT/JP2013/069553 filed Jul. 18, 2013.

* cited by examiner

OPTICAL FIBER LASER EQUIPMENT

CROSS-REFERENCE TO RELATED APPLICATIONS

This application is a continuation application of the PCT International Application No. PCT/JP2013/069553 filed on Jul. 18, 2013, which is based upon and claims the benefit of priority from the prior Japanese Patent Application No. 2012-159937, filed on Jul. 18, 2012; the entire contents of which are incorporated herein by reference.

BACKGROUND OF THE INVENTION

1. Field of the Invention

The present invention relates to an optical fiber laser device.

2. Description of the Related Art

In a case where a workpiece is processed by using a laser light, positioning must be conducted to determine a position on the workpiece to be processed, at which the laser light will be irradiated.

An invisible laser light cannot be acknowledged visually. Conventionally, for example, as shown in Japanese Laid-open Patent Publication No. 2005-13348 and Japanese Laid-open Patent Publication No. H07-116878, a technology of positioning using a visible laser light exists in which an optical axis of an invisible laser light is adjusted to coincide with an optical axis of a visible laser light by using a half-mirror or the like.

Japanese Laid-open Patent Publication No. S62-008748 discloses a technology of disposing an optical fiber guiding a visible laser light to be parallel with an optical fiber guiding an invisible laser light, condensing laser lights output from each of output units of the optical fibers by using a lens, and causing the laser lights to be condensed at a same position in a predetermined distance from the output units.

SUMMARY OF THE INVENTION

It is an object of the present invention to solve at least a part of a problem of the above-described known technologies.

An optical fiber laser device according to an aspect of the present invention includes: an amplification optical fiber; a pumping light source outputting a pumping light making the amplification optical fiber be subjected to optical pumping; optical reflectors being disposed at two sides of the amplification optical fiber and configuring an optical resonator making laser oscillation of an invisible laser light from a light generated in the amplification optical fiber; an output optical fiber guiding the laser light and outputting the laser light to outside; a first visible light source outputting a visible light; an introduction unit having at least first and second input terminals and a first output terminal, the introduction unit having wavelength characteristics of outputting the laser light input to the first input terminal from the first output terminal mainly and outputting the visible light input to the second input terminal from the first output terminal mainly, the introduction unit making the visible light output by the first visible light source input from the second input terminal and introducing the visible light to the amplification optical fiber or the output optical fiber via the first output terminal; an optical multiplexer/demultiplexer connected to the first visible light source and connected to the second input terminal of the introduction unit, the visible light output by the first visible light source being input to the optical multiplexer/demultiplexer, the visible light being output to the introduction unit, the optical multiplexer/demultiplexer outputting a leaking return light input from a side of the introduction unit; and a controller driving the first visible light source and outputting the visible light from the output optical fiber in a case of determining a position, on a workpiece, at which the laser light will be irradiated.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
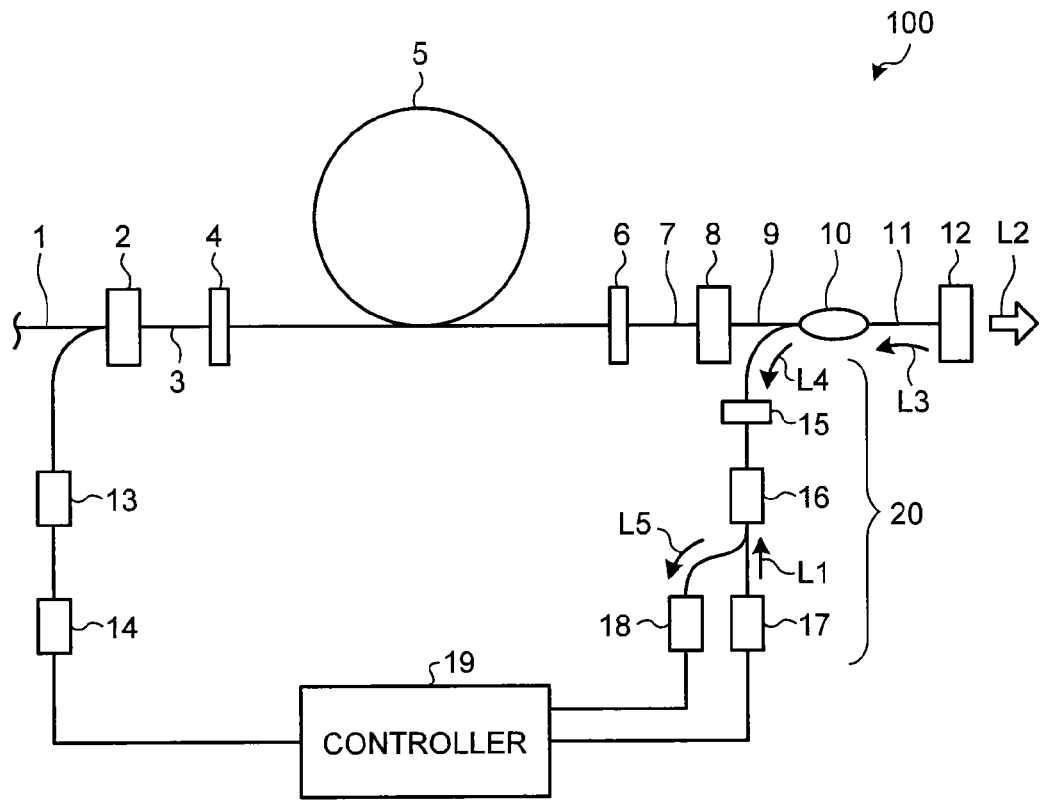
FIG. 1 is a schematic view of an optical fiber laser device according to an embodiment 1.

Hereafter, embodiments of the optical fiber laser device according to the present invention will be explained in detail with reference to the attached drawings. The present invention is not limited by the embodiments described above and can be modified unrestrictively without departing from the spirit of the present invention. In all the drawings for the embodiments below, identical or equivalent elements are given same reference numerals. It should be noted that the drawings show schematic examples. Accordingly, a relationship between respective elements may be different from real values. Among the drawings, there may be parts where the relationships and ratios of the shown sizes are different from one another.

In the technology disclosed by the above-described Patent Literatures, since wave-guide routes differ between the invisible laser light and the visible laser light, an irradiation position on the workpiece may deviate sometimes. As a result, there is a problem that an accurate positioning is impossible sometimes.

In contrast, embodiments being explained below are capable of more accurate positioning of an irradiation position of the laser light.

FIG. 1 is a schematic view of an optical fiber laser device according to the embodiment 1 of the present invention. As shown in FIG. 1, an optical fiber laser device 100 has a configuration in which an optical fiber 1, a pumping-light multiplexer 2, an optical fiber 3, an optical reflector 4, an amplification optical fiber 5, an optical reflector 6, an optical fiber 7, a cladding mode removal unit 8, an optical fiber 9 as an output optical fiber, a wavelength division-multiplexing optical multiplexer/demultiplexer 10 as an introduction unit, an optical fiber 11 as an output optical fiber, and an optical output unit 12 are connected in this order. A pumping laser diode (LD) 13 and a pumping-LD-driving power source 14 are connected to the pumping-light multiplexer 2 in this order. An optical filter 15 and a wavelength division-multiplexing optical multiplexer/demultiplexer 16 are connected in this order to the wavelength division-multiplexing optical multiplexer/demultiplexer 10. A visible light LD 17 outputting a visible light L1 and an optical detector 18 as an optical detector are connected to the wavelength division-multiplexing optical multiplexer/demultiplexer 16. The pumping-LD-driving power source 14, the visible light LD 17, and the optical detector 18 are connected to a controller 19.

The pumping LD 13 is configured by, for example, at least one multi-mode LD outputting a laser light of which power is equal to or greater than several Ws (hereafter a pumping light). The pumping-LD-driving power source 14 drives the pumping LD 13 in accordance with control by the controller 19.

The optical fiber 3 is configured by a double-cladding optical fiber having a single-mode core, for example. The pumping-light multiplexer 2 is configured by, for example, a tapered fiber bundle (TFB) or the like. The pumping-light multiplexer 2 inputs the pumping light output from the pumping LD 13 into the optical fiber 3.

The optical reflector 4 is configured by, for example, a Fiber-Brag Grating (FBG). Reflectivity at a reflection center wavelength of the optical reflector 4 is approximately 100%.

The amplification optical fiber 5 is configured by, for example, a double-cladding optical fiber in which a core is doped with a rare-earth element ion such as Erbium (Er) and Ytterbium (Yb), for example. A wavelength of the pumping light output from the pumping LD 13 is set at a wavelength capable of pumping the doped rare-earth element ion. In a case where the doped rare-earth element ion is Yb, a wavelength of the pumping light is, for example, 915 nm.

The optical reflector 6 is configured by, for example, an FBG. A reflection center wavelength of the optical reflector 6 coincides with the reflection center wavelength of the optical reflector 4 approximately, and a reflectivity at the reflection center wavelength is, for example, approximately 10 to 30%. As a result, the optical reflectors 4 and 6 disposed at both sides of ends of the amplification optical fiber 5 configure an optical resonator at the reflection center wavelength. The reflection center wavelength is set at a wavelength within a emission wavelength band of the rare-earth element with which the amplification optical fiber 5 is doped. In a case where the rare-earth element is Yb, the reflection center wavelength is, for example, 1080 nm.

When the pumping-light multiplexer 2 inputs the pumping light output from the pumping LD 13 into the optical fiber 3, the optical fiber 3 propagates the pumping light in an inner cladding to guide it to the amplification optical fiber 5. In the amplification optical fiber 5, optical pumping of the rare-earth element with which the core is doped is conducted while propagating the pumping light in the inner cladding to cause the rare-earth element to emit light. A light being emitted and corresponding to the reflection center wavelength of the optical reflectors 4 and 6 makes laser oscillation of an invisible laser light by the optical amplification operation of the amplification optical fiber 5 and an operation of the optical resonator configured by the optical reflectors 4 and 6 disposed at both sides of the ends of the amplification optical fiber 5. It is preferable that the core of the amplification optical fiber 5 be configured to have single-mode propagation characteristics at the laser oscillation wavelength, and it may be configured to have multi-mode propagation characteristics (including, for example, a fundamental mode and several higher-order modes).

The optical fiber 7 is configured by a single-mode double-cladding optical fiber. The cladding mode removal unit 8 has a function of removing the light propagating in the inner cladding of the optical fiber 7. The cladding mode removal unit 8 is formed by, for example, removing an outer cladding of the double-cladding optical fiber and applying a substance, of which refractive index is higher than that of the inner cladding, to the unit from which the outer cladding was removed. The configuration of the cladding mode removal unit 8 is not limited specifically.

The optical fibers 9 and 11 are configured by single-mode optical fibers. The optical output unit 12 is configured by, for example, an optical connector. The optical fibers 9 and 11 introduce the oscillated laser light to the optical output unit 12 and make an invisible output laser light L2 output from the optical output unit 12. The output laser light L2 is irradiated to a workpiece, which is not shown in the drawings, for conducting a predetermined process such as cutting and the like.

The wavelength division-multiplexing optical multiplexer/demultiplexer 10 is interposed between the optical fibers 9 and 11 at an output side of the amplification optical fiber 5. The wavelength division-multiplexing optical multiplexer/demultiplexer 10 has wavelength characteristics making a light at the wavelength of the output laser light L2 be transmitted with low loss between the optical fibers 9 and 11. On the other hand, the wavelength division-multiplexing optical multiplexer/demultiplexer 10 has wavelength characteristics making a light at the wavelength of the output laser light L1 be transmitted with low loss and making a light at the wavelength of the output laser light L2 be attenuated to a large degree between the optical fiber 11 and the optical filter 15 (for example, by 10 dB to 40 dB).

The optical filter 15 has wavelength characteristics making the visible light L1 be transmitted with low loss and making the light at the wavelength of the output laser light L2 be attenuated to a large degree (for example, by 10 dB to 40 dB). The optical filter 15 can be configured by a band-pass optical filter (BPF), a short wave pass filter (SWPF), a long wave pass filter (LWPF), a wavelength division-multiplexing optical multiplexer/demultiplexer or the like.

The wavelength division-multiplexing optical multiplexer/demultiplexer 16 has wavelength characteristics making the light at the wavelength of the output laser light L2 be transmitted with low loss between the optical filter 15 and the optical detector 18. On the other hand, the wavelength division-multiplexing optical multiplexer/demultiplexer 16 has wavelength characteristics making the light at the wavelength of the visible light L1 be transmitted with low loss and making the light at the wavelength of the oscillated laser light be attenuated to a large degree between the optical filter 15 and the visible light LD 17 (for example, by 10 dB to 40 dB). The wavelength division-multiplexing optical multiplexer/demultiplexer 16 may be identical to the wavelength division-multiplexing optical multiplexer/demultiplexer 10.

The visible light LD 17 is configured by a laser diode capable of outputting the visible light L1 which is, for example, a red visible laser light (for example, wavelength of 638 nm). An optical power of the visible light L1 from the visible light LD 17 is set to a degree that the visible light L1 is visible when being irradiated to the workpiece.

The optical detector 18 has a configuration capable of receiving a light and outputting an electric current signal corresponding to a power of the received light. The optical detector 18 is configured by, for example, a photo-diode.

A configuration including the optical filter 15, the wavelength division-multiplexing optical multiplexer/demultiplexer 16, the visible light LD 17, and the optical detector 18 is hereafter called a light-emitting-and-light-receiving unit 20.

The controller 19 has, for example, a Central processing unit (CPU), a Read only memory (ROM), a Random access memory (RAM), an interface (I/F), and a bus connecting these components with one another. The CPU controls each component based on a program and data stored in the ROM. The ROM is a nonvolatile semiconductor storage device storing the program and the data. The RAM is a volatile semiconductor storage device and operates as a work area when the CPU executes the program. The I/F is configured by, for example, a digital analog converter (DAC) and an analog digital converter (ADC), or the like. The I/F converts digital data supplied from the CPU to an analogue signal to supply to the pumping-LD-driving power source 14 and the visible light LD 17, and converts an analogue current signal from the optical detector 18 to a digital signal. The bus is a signal line group connecting the CPU, the ROM, the RAM, and the I/F with one another and being capable of receiving and supplying data among these components. The controller 19 is not limited to one using the CPU or the like and may be one using, for example, a digital signal processor (DSP) or one using an analogue control method instead of a digital control method.

Figure 2:
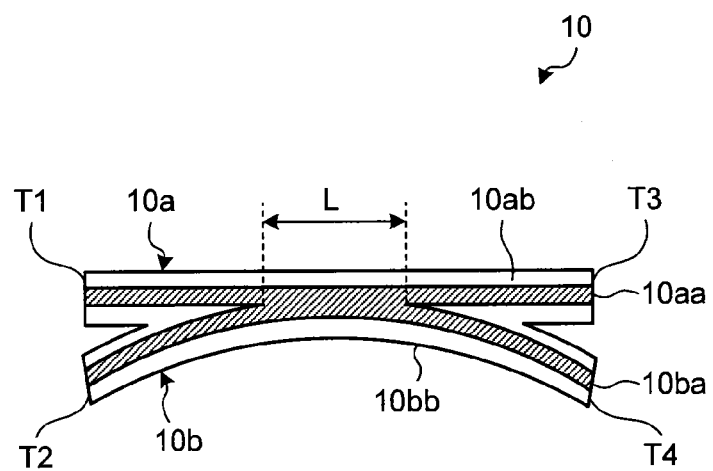
FIG. 2 is a view explaining a configuration of a wavelength division-multiplexing optical multiplexer/demultiplexer.

Hereafter the wavelength division-multiplexing optical multiplexer/demultiplexer 10 will be explained more specifically. FIG. 2 is a view for explaining a configuration of the wavelength division-multiplexing optical multiplexer/demultiplexer 10.

The wavelength division-multiplexing optical multiplexer/demultiplexer 10 is configured by two optical fibers 10a and 10b. Each of the two optical fibers 10a and 10b has a core 10aa and a cladding 10ab, or a core 10ba and a cladding 10bb. The two optical fibers 10a and 10b have single-mode propagation characteristics at the wavelength of the output laser light L2 respectively, and are fibers of approximately the same characteristics of, for example, cut-off wavelength of 920±50 nm. A terminal T1 is connected to the optical fiber 9, a terminal T2 is connected to the optical filter 15, and a terminal T3 is connected to the optical fiber 11. Ae terminal T4 may be an end with no reflection.

In a case where the terminal T4 is the end with no reflection, a configuration will be preferable in which, a beam is incident to a radiation component made of a metal component or the like such as, for example, aluminum (Al) and the like, and the incident beam is subjected to thermal conversion, and then radiated.

In the wavelength division-multiplexing optical multiplexer/demultiplexer 10, units of the claddings 10ab and 10bb are fused and coupled, and the cores 10aa and 10ba are welded over the length L. In the wavelength division-multiplexing optical multiplexer/demultiplexer 10 as such, a mode coupling occurs between the cores 10aa and 10ba, and transmission of energy occurs between the cores 10aa and 10ba. In this state, dependency of a branch ratio on wavelength is determined in accordance with a distance between the cores 10aa and 10ba and with the length L of welding. In the example of FIG. 2, since a mode coupling in a visible wavelength region is dominant between the core 10ba and the core 10aa between the terminal T2 and the terminal T3, a loss of the visible light L1 input into the terminal T2 is relatively low and the visible light L1 is output mainly from the terminal T3. Since a mode coupling at the wavelength region of the invisible laser light including the wavelength of the output laser light L2 is restrained between the terminal T2 and the terminal T3, the invisible laser light input into the terminal T3 is emitted mainly to the terminal T1 side, the invisible laser light output the terminal T2 side is attenuated. Although the cores 10aa and 10ba are welded in the example of the wavelength division-multiplexing optical multiplexer/demultiplexer 10 shown in FIG. 2, the wavelength division-multiplexing optical multiplexer/demultiplexer 10 is not limited to this example, and a wavelength division-multiplexing optical multiplexer/demultiplexer may be used which uses a method of making two fused and elongated cores close by a distance in an order of a wavelength of a propagation light to cause a mode coupling between the cores, and thereby to transmit energy between the cores.

Hereafter an operation of the optical fiber laser device 100 will be explained. At a step prior to processing of the workpiece, the controller 19 is in a state where operations of both the visible light LD 17 and the pumping LD 13 are stopped. When the workpiece in this state is mounted on a workpiece stand, which is not shown in the drawing, and an operation (positioning) for determining a position at which the visible light L1 is to be irradiated is conducted (for example, if a "positioning button" not shown in the drawing is operated), the CPU of the controller 19 detects this operation via the I/F.

The CPU executes a process of conducting a positioning based on the program stored in the ROM. To be more specific, the CPU obtains control data from the data based on the program and conducting a D/A conversion at the I/F, and then supplies the converted control data to the visible light LD 17. As a result, the visible light LD 17 outputs the visible light L1. The visible light L1 passes through the wavelength division-multiplexing optical multiplexer/demultiplexer 16, the optical filter 15, the wavelength division-multiplexing optical multiplexer/demultiplexer 10, and the optical fiber 11 to be output from the optical output unit 12, and then irradiated at a position at which the workpiece is to be processed (a position at which the visible light L1 is irradiated). Hereby positioning is conducted for the position at which the output laser light L2 is irradiated. Because of the wavelength characteristics by which the above-described optical filter 15 transmits the visible light L1 therethrough with low loss, the visible light L1 is irradiated at the workpiece with a power which is sufficient to be recognized visually (for example, equal to or greater than approximately 2 μW).

Upon completing the positioning, the controller 19 stops irradiating the visible light LD 17. Hereby the irradiation of the visible light L1 to the workpiece is stopped. Subsequently, upon an instruction of starting a process, the CPU obtains data, corresponding to an irradiation power, for driving the pumping LD 13 from data stored by the ROM and supplies to the I/F. The I/F causes the supplied data for driving to be subjected to D/A conversion and supplies to the pumping-LD-driving power source 14. The pumping-LD-driving power source 14 drives the pumping LD 13 in accordance with an instruction value supplied from the I/F. As a result, the pumping LD 13 outputs a pumping light and supplies to the amplification optical fiber 5 via the pumping-light multiplexer 2, the optical fiber 3, and the optical reflector 4. Hereby the optical fiber laser device 100 starts laser oscillation, a laser light is output from the optical reflector 6, and after a residual pumping light is removed by the cladding mode removal unit 8, the output laser light L2 is irradiated to the workpiece via the optical output unit 12.

Herein the visible light L1 and the output laser light L2 transmit through the same optical fiber 11 and are output from the optical output unit 12. Therefore, the position at which the output laser light L2 is irradiated is approximately the same as the position at which the visible light L1 is irradiated. Hereby the optical fiber laser device 100 is capable of accurate processing, by the output laser light L2, at the position positioned accurately with the visible light L1.

Sometimes, a part of the output laser light L2 is reflected or scattered by the workpiece and returned as a return light L3. The return light L3 is propagated through the optical fiber 11 in the optical fiber laser device 100 in a direction opposite to the output laser light L2, and reaches the wavelength division-multiplexing optical multiplexer/demultiplexer 10. In the wavelength division-multiplexing optical multiplexer/demultiplexer 10, most of the return light L3 is output to the optical fiber 9 side (a side of the terminal T1 in FIG. 2) by the wavelength characteristics of the wavelength division-multiplexing optical multiplexer/demultiplexer 10, a part of the return light L3 leaks as a leaking return light L4 to the optical filter 15 side (the terminal T2 side). For example, in a case where a power of the return light L3 is 500 W, a power of the return light L4 can be 1% thereof, i.e., approximately 5 W.

The optical filter 15 attenuates the leaking return light L4 input thereinto. The wavelength division-multiplexing optical multiplexer/demultiplexer 16 makes the most of the leaking return light L4 attenuated by the optical filter 15 transmitted as a leaking return light L5 to the optical detector 18.

The optical detector 18 receives the leaking return light L5 and outputs an analogue current signal corresponding to the power of the leaking return light L5 to the controller 19. In the controller 19, the I/F causes the analogue current signal from the optical detector 18 to be converted to a digital signal, and the bus supplies the converted digital signal to the CPU. The CPU calculates an optical power of the return light L3 based on the digital signal. Hereby the optical power of the return light L3 can be monitored.

The present embodiment 1 is configured to monitor the optical power of the return light L3 by making use of a return light leaking from the wavelength division-multiplexing optical multiplexer/demultiplexer 10 outputting the visible light L1 from the optical output unit 12. As a result, the power of the output laser light L2 for processing is prevented from being attenuated wastefully by an optical loss of an optical component provided for monitoring use.

The power of return lights, of the leaking return light L4, being input to the visible light LD 17 and the optical detector 18 is restrained by the optical filter 15 and the wavelength division-multiplexing optical multiplexer/demultiplexer 16 to the degree that the visible light LD 17 and the optical detector 18 are not damaged or deteriorated (for example, equal to or lower than approximately 10 mW).

The CPU compares the calculated optical power with the data stored by the ROM, and if the optical power of the return light L3 is equal to or greater than a certain first set value, the CPU is capable of stopping driving the pumping LD 13 to prevent the optical fiber laser device 100 from being damaged by the return light L3 or lowering the pumping-light output by lowering a current for driving the pumping LD 13. Alternatively, the CPU compares the calculated optical power with the data stored by the ROM, and if the optical power of the return light L3 is equal to or smaller than another second set value, the CPU determines that the power of the return light L3 decreased because some kind of fault on the optical fiber such as disconnection and the like occurs to stop driving the pumping LD 13 or lowering the pumping-light output by lowering the current for driving the pumping LD 13. Alternatively, instead of stopping driving the pumping LD 13 or lowering the current for driving the pumping LD 13, the controller 19 may notify an operator of a state by producing a warning by a sound generator or a visual display device.

Upon finishing a desirable process, the CPU of the controller 19 stops driving the pumping LD 13. Hereby the irradiation of the output laser light L2 from the optical fiber laser device 100 is stopped.

As described above, the optical fiber laser device 100 according to the present embodiment 1 is capable of accurate positioning of a position at which the laser light is irradiated and monitoring the return light while restraining the power of the laser light for the process from decreasing.

A thermal conversion unit may be connected to an end, at a left-hand side of the drawing, of the optical fiber 1. In the thermal conversion unit, an optical power from the end of the optical fiber is input into a metal component such as aluminum (Al) and the like to be subjected to the thermal conversion. Hereby the return light of the laser light input with high output into the thermal conversion unit can be subjected to the thermal conversion, and then be radiated. As the thermal conversion unit other than the above described one, for example, an axis-offset-and-fusion-spliced section in which two optical fibers are fusion-spliced with their center axes deviated from each other is provided in the vicinity of the end of the optical fiber, and a component conducting thermal conversion by transmitting a leak light from the axis-offset-and-fusion-spliced section to a metal component or the like may be used.

Figure 3:
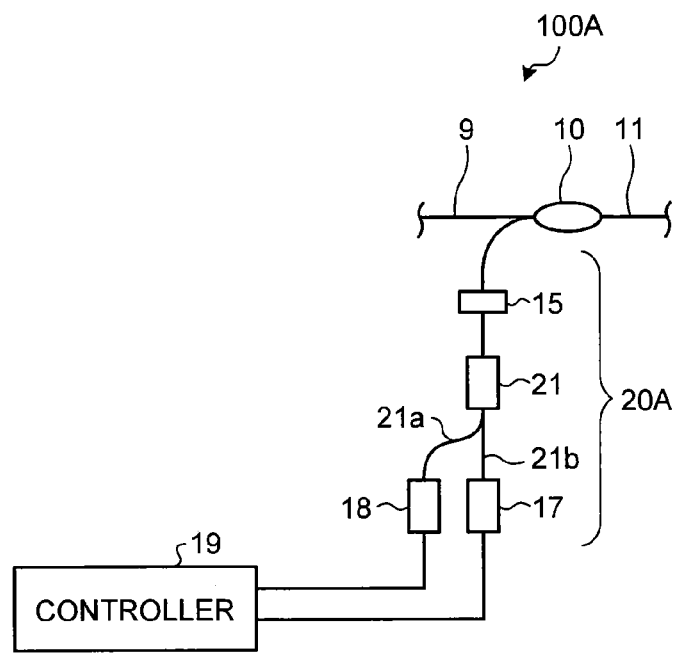
FIG. 3 is a schematic view explaining an essential part of an optical fiber laser device according to a modification example 1 of the embodiment 1.

FIG. 3 is a schematic view describing an essential part of an optical fiber laser device according to a modification example 1 of the embodiment 1 of the present invention. An optical fiber laser device 100A has a configuration in which the light-emitting-and-light-receiving unit 20 of the optical fiber laser device 100 shown in FIG. 1 is replaced with a light-emitting-and-light-receiving unit 20A.

The light-emitting-and-light-receiving unit 20A has a configuration in which the wavelength division-multiplexing optical multiplexer/demultiplexer 16 of the light-emitting-and-light-receiving unit 20 is replaced with an optical multiplexer/demultiplexer 21. The optical multiplexer/demultiplexer 21 is of a kind called Tap coupler which branches a light input from the optical filter 15 side by a greater branch ratio and outputs to the terminal 21a and the terminal 21b. The branch ratio of the optical powers of the terminal 21a and the terminal 21b of the optical multiplexer/demultiplexer 21 according to the present modification example 1 is 1:10000 at a wavelength band of an output laser light. The optical multiplexer/demultiplexer 21 is called also a 40-dB coupler. The terminal 21a is connected to the optical detector 18, and the terminal 21b is connected to the visible light LD 17.

In the light-emitting-and-light-receiving unit 20A, the power of the return light input into the visible light LD 17 is attenuated to an appropriate quantity by the optical filter 15. The power of the return light input into the optical detector 18 is attenuated to an appropriate quantity by the optical filter 15 and the optical multiplexer/demultiplexer 21.

Figure 4:
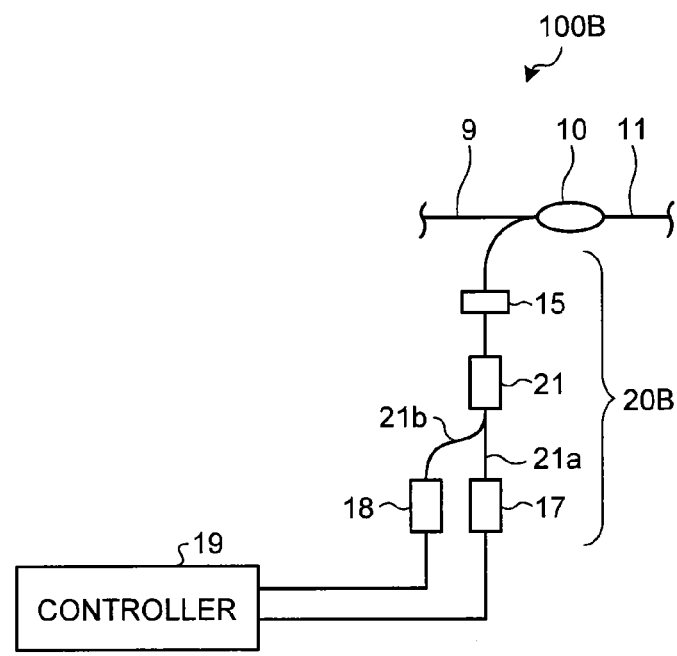
FIG. 4 is a schematic view explaining an essential part of an optical fiber laser device according to a modification example 2 of the embodiment 1.

FIG. 4 is a schematic view explaining an essential part of an optical fiber laser device according to a modification example 2 of the embodiment 1 of the present invention. An optical fiber laser device 100B has a configuration in which the light-emitting-and-light-receiving unit 20 of the optical fiber laser device 100 shown in FIG. 1 is replaced with a light-emitting-and-light-receiving unit 20B.

In the light-emitting-and-light-receiving unit 20B, the terminal 21a of the optical multiplexer/demultiplexer 21 of the light-emitting-and-light-receiving unit 20A is connected to the visible light LD 17 and the terminal 21b is connected to the optical detector 18.

In the light-emitting-and-light-receiving unit 20B, the power of a return light input into the visible light LD 17 is attenuated to an appropriate quantity by the optical filter 15 and the optical multiplexer/demultiplexer 21. The power of a return light input into the optical detector 18 is attenuated to an appropriate quantity by the optical filter 15.

Figure 5:
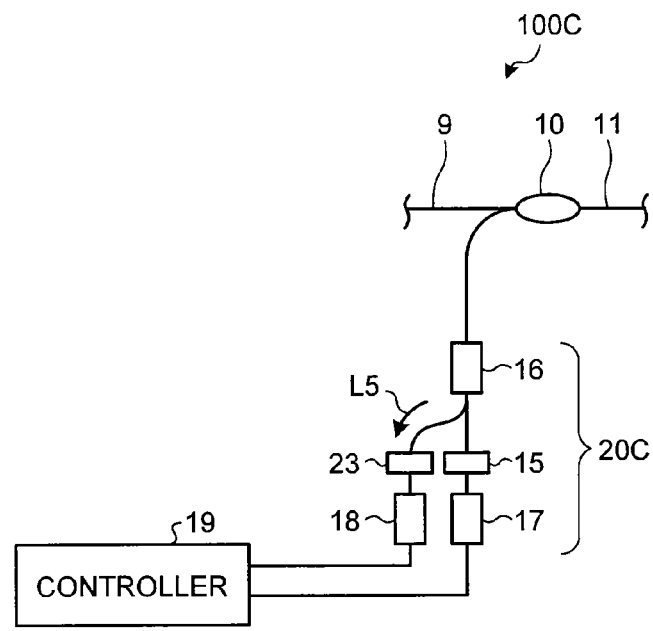
FIG. 5 is a schematic view explaining an essential part of an optical fiber laser device according to a modification example 3 of the embodiment 1.

FIG. 5 is a schematic view explaining an essential part of an optical fiber laser device according to a modification example 3 of the embodiment 1 of the present invention. An optical fiber laser device 100C has a configuration in which the light-emitting-and-light-receiving unit 20 of the optical fiber laser device 100 shown in FIG. 1 is replaced with a light-emitting-and-light-receiving unit 20C.

The light-emitting-and-light-receiving unit 20C has a configuration in which the optical filter 15 is moved and disposed between the wavelength division-multiplexing optical multiplexer/demultiplexer 16 and the visible light LD 17 in the light-emitting-and-light-receiving unit 20, and the optical attenuator 23 is disposed between the wavelength division-multiplexing optical multiplexer/demultiplexer 16 and the optical detector 18. The optical attenuator 23 has characteristics that a light at the wavelength of at least the leaking return light L5 is attenuated to a large degree (for example, by 10 dB to 40 dB). The optical attenuator 23 can be configured by an axis-offset-and-fusion-spliced optical fiber in which two optical fibers are fusion-spliced with their center axes deviated from each other or by an optical filter or the like having wavelength characteristics similar to those of the optical filter 15.

In the light-emitting-and-light-receiving unit 20C, the power of a return light input to the visible light LD 17 is attenuated to an appropriate quantity by the wavelength division-multiplexing optical multiplexer/demultiplexer 16 and the optical filter 15. The power of a return light input to the optical detector 18 is attenuated to an appropriate quantity by the wavelength division-multiplexing optical multiplexer/demultiplexer 16 and the optical attenuator 23.

The optical filter 15 may be deleted in the light-emitting-and-light-receiving unit 20C if it is deemed appropriate.

A radiator/thermal convertor for making a leak light produced in the optical attenuator 23 be subjected to thermal conversion may be provided to the optical attenuator 23. The radiator/thermal convertor may be configured so that a beam is incident to a radiation component made of a metal component or the like such as, for example, aluminum (Al) and the like, and the incident beam is subjected to thermal conversion, and then radiated. In a case where the optical attenuator 23 is configured by an axis-offset-and-fusion-spliced optical fiber, the radiator/thermal convertor can be configured so that thermal conversion is conducted by making a leak light from the axis-offset-and-fusion-spliced section incident into a radiation component. The radiator/thermal convertor may be provided to an optical attenuator in modification examples or embodiments below if it is deemed appropriate.

Figure 6:
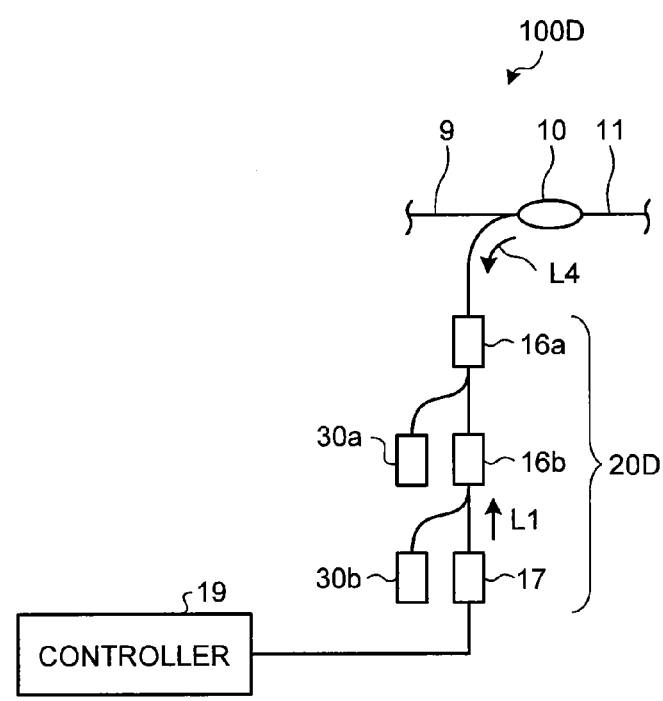
FIG. 6 is a schematic view explaining an essential part of an optical fiber laser device according to a modification example 4 of the embodiment 1.

FIG. 6 is a schematic view explaining an essential part of an optical fiber laser device according to a modification example 4 of the embodiment 1 of the present invention. An optical fiber laser device 100D has a configuration in which the light-emitting-and-light-receiving unit 20 of the optical fiber laser device 100 shown in FIG. 1 is replaced with a light-emitting-and-light-receiving unit 20D.

The light-emitting-and-light-receiving unit 20D can be regarded as a configuration in which, in the light-emitting-and-light-receiving unit 20 shown in FIG. 1, the combination of the optical filter 15 and the wavelength division-multiplexing optical multiplexer/demultiplexer 16 is replaced with a combination of two wavelength division-multiplexing optical multiplexers/demultiplexers 16a and 16b. The light-emitting-and-light-receiving unit 20D can be regarded as a configuration in which, in the light-emitting-and-light-receiving unit 20C shown in FIG. 5, the combination of the wavelength division-multiplexing optical multiplexer/demultiplexer 16 and the optical filter 15 is replaced with the combination of the two wavelength division-multiplexing optical multiplexers/demultiplexers 16a and 16b. That is, the wavelength division-multiplexing optical multiplexers/demultiplexers 16a and 16b have a function of an optical filter substantially. The visible light LD 17 is connected to the wavelength division-multiplexing optical multiplexer/demultiplexer 16b and is also connected to the controller 19.

The wavelength division-multiplexing optical multiplexer/demultiplexer 16a is connected to the terminal T2 of the wavelength division-multiplexing optical multiplexer/demultiplexer 10 (See FIG. 2). The wavelength division-multiplexing optical multiplexer/demultiplexer 16a transmits, by its wavelength characteristics, most of the leaking return light L4 leaking from the terminal T2 of the wavelength division-multiplexing optical multiplexer/demultiplexer 10 to a radiator 30a side and transmits the rest of the leaking return light L4 to the wavelength division-multiplexing optical multiplexer/demultiplexer 16b side. Similarly, the wavelength division-multiplexing optical multiplexer/demultiplexer 16b transmits, by its wavelength characteristics, most of the leaking return light L4 input from the wavelength division-multiplexing optical multiplexer/demultiplexer 16a to a radiator 30b side and transmits the rest of the leaking return light L4 to the visible light LD 17 side. Therefore, the power of the leaking return light L4 reaching the visible light LD 17 is attenuated appropriately; thus a possibility of damaging the visible light LD 17 is very little. For example, even in a case where the power of the return light L3 is 500 W, the leaking return light L4 reaching the visible light LD 17 is attenuated to a degree of not damaging or deteriorating the visible light LD 17, e.g., smaller than 1 mW.

On the other hand, most of the visible light L1 output from the visible light LD 17 is transmitted to the wavelength division-multiplexing optical multiplexer/demultiplexer 16a by the wavelength characteristics of the wavelength division-multiplexing optical multiplexer/demultiplexer 16b, and most of the visible light L1 transmitted to the wavelength division-multiplexing optical multiplexer/demultiplexer 16a is transmitted to the wavelength division-multiplexing optical multiplexer/demultiplexer 10 by the wavelength characteristics of the wavelength division-multiplexing optical multiplexer/demultiplexer 16a, and then introduced to the optical fiber 11 by the wavelength characteristics of the wavelength division-multiplexing optical multiplexer/demultiplexer 10. That is, the visible light L1 output from the visible light LD 17 is introduced to the optical fiber 11 without being attenuated to a large degree, and is used for positioning for irradiating the output laser light L2.

The radiators 30a and 30b connected to the wavelength division-multiplexing optical multiplexers/demultiplexers 16a and 16b respectively are terminators as radiators/thermal convertors for making a part of the leaking return light L4 being incident be subjected to thermal conversion. The radiators 30a and 30b may be configured so that a beam is incident to a radiation component made of a metal component or the like such as, for example, aluminum (Al) and the like, and the incident beam is subjected to thermal conversion, and then radiated. The radiators 30a and 30b may be configured to conduct thermal conversion by, for example, providing an axis-offset-and-fusion-spliced section in the vicinity of an end of an optical fiber, and making a leak light from the axis-offset-and-fusion-spliced section incident to the radiation component.

Hereafter, even in a case of not explicitly describing that a terminator is provided at a terminal of the optical fiber, an appropriate terminator is supposed to be provided at the terminal of the optical fiber. It is preferable that the radiator 30 as a terminator be provided at the terminal of the optical fiber.

The present modification example 4 may be configured to be further modified as follows.

For example, it may be configured to be provided with an optical detector in place of the radiator 30a. Herein the optical detector is configured by, for example, a photo-diode outputting an electric current signal to the controller 19 corresponding to the power of a received light. In a case where the optical detector is provided in place of the radiator 30a, it is preferable that an optical attenuator be provided between the wavelength division-multiplexing optical multiplexer/demultiplexer 16a and the optical detector similarly to the modification example 3. The optical attenuator attenuates a light at the wavelength of the leaking return light similarly to that of the modification example 3 and can be of the configuration that is the same as that of the modification example 3.

It may be configured in which an optical detector is provided in place of the radiator 30b. Also, in a case where the optical detector is provided in place of the radiator 30b, it is preferable that an optical attenuator be provided between the wavelength division-multiplexing optical multiplexer/demultiplexer 16b and the optical detector similarly to the modification example 3. The optical attenuator in this case may be of the configuration that is the same as that of the modification example 3.

It may be configured in which an optical detector is provided in place of the visible light LD 17 and the visible light LD 17 may be provided in place of the radiator 30a. In this case, the wavelength characteristics of the wavelength division-multiplexing optical multiplexer/demultiplexer 16a must be configured so that most of the leaking return light L4 leaking from the terminal T2 of the wavelength division-multiplexing optical multiplexer/demultiplexer 10 is transmitted to the wavelength division-multiplexing optical multiplexer/demultiplexer 16b side, and a connection port must be changed to transmit the rest of the leaking return light L4 to the visible light LD 17 side. In a case where the visible light LD 17 is provided in place of the radiator 30a, it is preferable that the optical filter be provided between the wavelength division-multiplexing optical multiplexer/demultiplexer 16a and the visible light LD 17 similarly to the modification example 3. This optical filter is low in attenuation for a beam emitted from the visible light LD 17 similarly to other modification examples and has wavelength characteristics of high in attenuation for the leaking return light L4.

Figure 7:
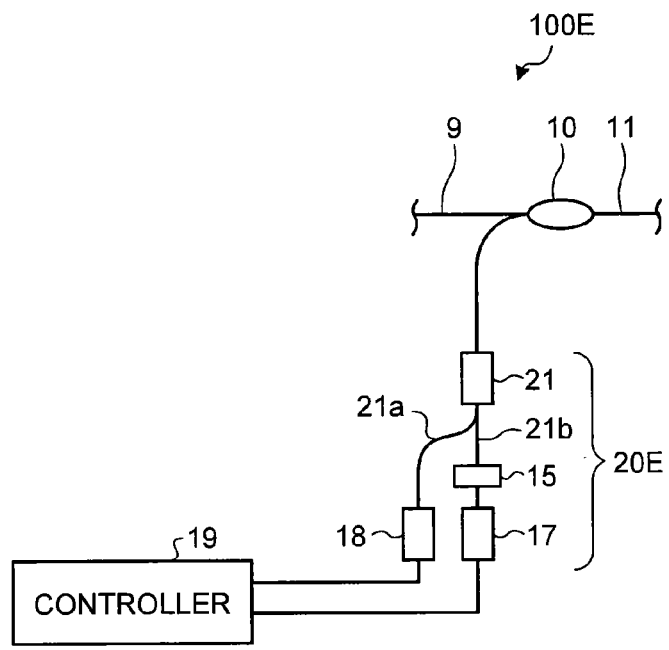
FIG. 7 is a schematic view explaining an essential part of an optical fiber laser device according to a modification example 5 of the embodiment 1.

FIG. 7 is a schematic view explaining an essential part of an optical fiber laser device according to a modification example 5 of the embodiment 1 of the present invention. An optical fiber laser device 100E has a configuration in which the light-emitting-and-light-receiving unit 20 of the optical fiber laser device 100 shown in FIG. 1 is replaced with a light-emitting-and-light-receiving unit 20E.

The light-emitting-and-light-receiving unit 20E has a configuration in which the optical filter 15 is moved and disposed between the optical multiplexer/demultiplexer 21 and the visible light LD 17 in the light-emitting-and-light-receiving unit 20A.

In the light-emitting-and-light-receiving unit 20E, the power of the return light input into the visible light LD 17 is attenuated to an appropriate quantity by the optical filter 15. The power of the return light input into the optical detector 18 is attenuated to an appropriate quantity by the optical multiplexer/demultiplexer 21.

Figure 8:
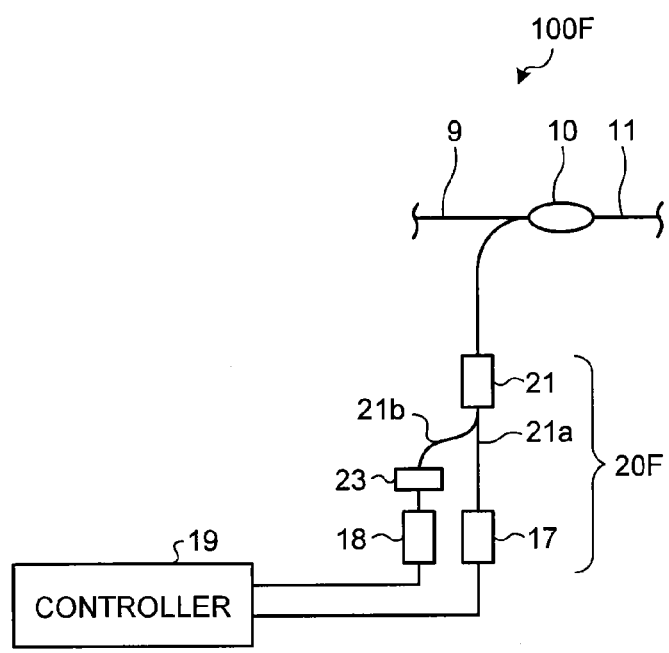
FIG. 8 is a schematic view explaining an essential part of an optical fiber laser device according to a modification example 6 of the embodiment 1.

FIG. 8 is a schematic view explaining an essential part of an optical fiber laser device according to a modification example 6 of the embodiment 1 of the present invention. An optical fiber laser device 100F has a configuration in which the light-emitting-and-light-receiving unit 20 of the optical fiber laser device 100 shown in FIG. 1 is replaced with a light-emitting-and-light-receiving unit 20F.

The light-emitting-and-light-receiving unit 20F has a configuration in which the optical filter 15 is deleted in the light-emitting-and-light-receiving unit 20B shown in FIG. 4 and the optical attenuator 23 is disposed between the optical multiplexer/demultiplexer 21 and the optical detector 18.

In the light-emitting-and-light-receiving unit 20F, the power of the return light input into the visible light LD 17 is attenuated to an appropriate quantity by the optical multiplexer/demultiplexer 21. The power of the return light input into the optical detector 18 is attenuated to an appropriate quantity by the optical attenuator 23.

Figure 9:
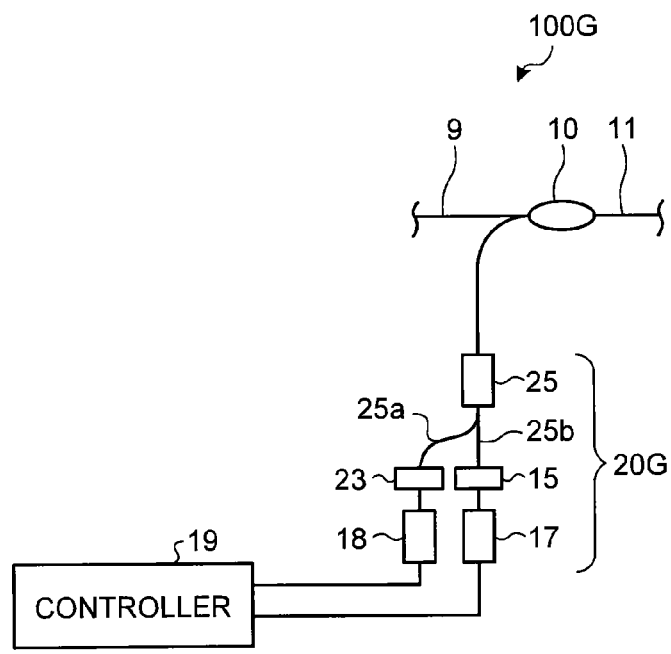
FIG. 9 is a schematic view explaining an essential part of an optical fiber laser device according to a modification example 7 of the embodiment 1.

FIG. 9 is a schematic view explaining an essential part of an optical fiber laser device according to a modification example 7 of the embodiment 1 of the present invention. An optical fiber laser device 100G has a configuration in which the light-emitting-and-light-receiving unit 20 of the optical fiber laser device 100 shown in FIG. 1 is replaced with a light-emitting-and-light-receiving unit 20G.

The light-emitting-and-light-receiving unit 20G has a configuration in which the wavelength division-multiplexing optical multiplexer/demultiplexer 16 of the light-emitting-and-light-receiving unit 20C is replaced with the optical multiplexer/demultiplexer 25. The optical multiplexer/demultiplexer 25 is of a kind called a Tap coupler which branches a light input from the wavelength division-multiplexing optical multiplexer/demultiplexer 10 side by a greater branch ratio and outputs to the terminal 25a and the terminal 25b. The branch ratio of the optical powers of the terminal 25a and the terminal 25b of the optical multiplexer/demultiplexer 25 according to the present modification example 7 is 1:100 to 1:1000. The optical multiplexer/demultiplexer 25 is called a 20 dB to 30 dB coupler. The terminal 25a is connected to the optical detector 18 via the optical attenuator 23. The terminal 25b is connected to the visible light LD 17 via the optical filter 15.

In the light-emitting-and-light-receiving unit 20G, the power of a return light input to the visible light LD 17 is attenuated to an appropriate quantity by the optical filter 15. The power of the return light input into the optical detector 18 is attenuated to an appropriate quantity by the optical multiplexer/demultiplexer 25 and the optical attenuator 23.

The optical attenuator 23 may be deleted in the light-emitting-and-light-receiving unit 20G if it is deemed appropriate.

Figure 10:
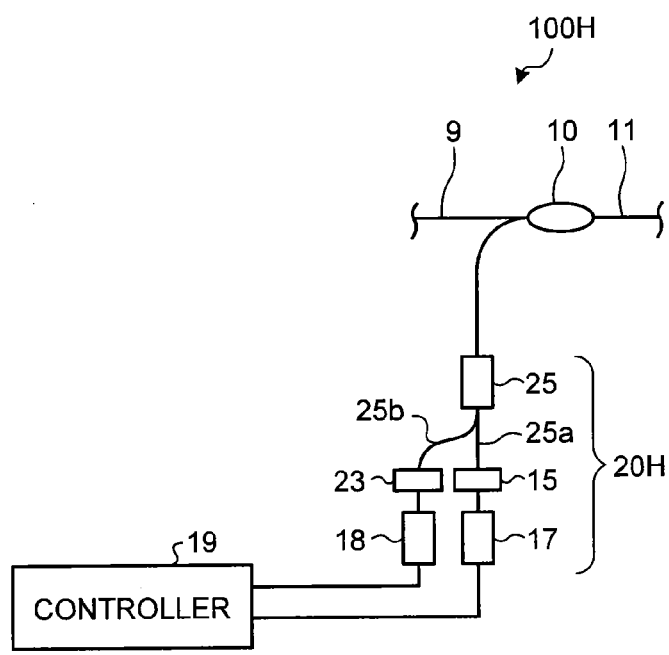
FIG. 10 is a schematic view explaining an essential part of an optical fiber laser device according to a modification example 8 of the embodiment 1.

FIG. 10 is a schematic view explaining an essential part of an optical fiber laser device according to a modification example 8 of the embodiment 1 of the present invention. An optical fiber laser device 100H has a configuration in which the light-emitting-and-light-receiving unit 20 of the optical fiber laser device 100 shown in FIG. 1 is replaced with a light-emitting-and-light-receiving unit 20H.

In the light-emitting-and-light-receiving unit 20H, the terminal 25a of the optical multiplexer/demultiplexer 25 of the light-emitting-and-light-receiving unit 20G is connected to the visible light LD 17 side and the terminal 25b is connected to the optical detector 18 side.

In the light-emitting-and-light-receiving unit 20H, the power of a return light input to the visible light LD 17 is attenuated to an appropriate quantity by the optical multiplexer/demultiplexer 25 and the optical filter 15. The power of a return light input to the optical detector 18 is attenuated to an appropriate quantity by the optical attenuator 23.

The optical filter 15 may be deleted in the light-emitting-and-light-receiving unit 20H if it is deemed appropriate.

Figure 11:
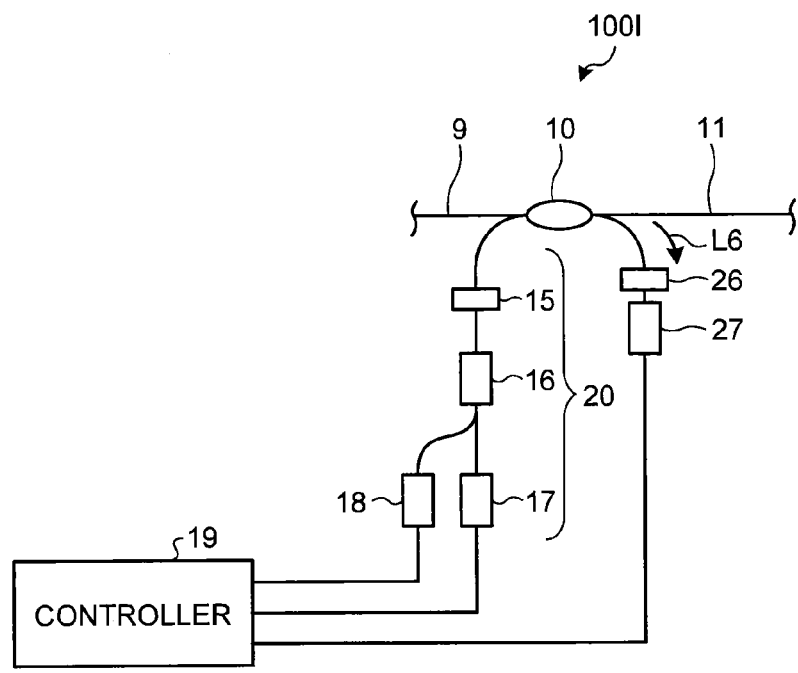
FIG. 11 is a schematic view explaining an essential part of an optical fiber laser device according to a modification example 9 of the embodiment 1.

FIG. 11 is a schematic view explaining an essential part of an optical fiber laser device according to a modification example 9 of the embodiment 1 of the present invention. An optical fiber laser device 100I has a configuration in which an optical attenuator 26 and an optical detector 27 are added to the optical fiber laser device 100 shown in FIG. 1.

The optical attenuator 26 is connected to the terminal T4 of the wavelength division-multiplexing optical multiplexer/demultiplexer 10 (See FIG. 2). The optical attenuator 26 has characteristics making at least a light at the wavelength of the output laser light L2 be attenuated to a large degree (for example, by 10 dB to 40 dB). The optical attenuator 26 is configured by an axis-offset-and-fusion-spliced optical fiber in which two optical fibers are fusion-spliced with their center axes deviated from each other or by an optical filter or the like having wavelength characteristics similar to those of the optical filter 15. The above-described radiator/thermal convertor may be provided also to the optical attenuator 26 if it is deemed appropriate.

The optical detector 27 is connected to the optical attenuator 26 and is also connected to the controller 19. The optical detector 27 has a configuration capable of receiving a light at the wavelength of the output laser light L2 and outputting an electric current signal corresponding to the power of the received light. The optical detector 27 is configured by, for example, a photo-diode.

Since the light-emitting-and-light-receiving unit 20 shown in FIG. 11 has the same configuration as that of the light-emitting-and-light-receiving unit 20 of the optical fiber laser device 100 shown in FIG. 1, explanation therefor is omitted herein. The optical fiber laser device 100I may be configured in which the light-emitting-and-light-receiving unit 20 is replaced with the light-emitting-and-light-receiving units 20A to 20H shown in FIGS. 3 to 10 if it is deemed appropriately. An element may be omitted in the configurations of the light-emitting-and-light-receiving units 20A to 20H shown in FIGS. 3 to 10, and alternatively, an additional element may replace with the light-emitting-and-light-receiving unit 20 according to uses thereof. For example, an optical filter or an attenuator preventing a leaking return light from being input to the visible light LD 17 may be provided to the terminal T2 of the wavelength division-multiplexing optical multiplexer/demultiplexer 10 in place of the wavelength division-multiplexing optical multiplexer/demultiplexer 16.

In the optical fiber laser device 100I, the wavelength division-multiplexing optical multiplexer/demultiplexer 10 leaks and outputs a laser light L6 as a part of the laser light introduced through the optical fiber 9 from the terminal T4. The optical attenuator 26 attenuates the laser light L6. The optical detector 27 receives the attenuated laser light L6 and outputs an analogue current signal corresponding to the power of the received light to the controller 19. In the controller 19, the I/F converts the analogue current signal from the optical detector 27 to a digital signal, and the bus supplies the converted digital signal to the CPU. The CPU calculates an optical power of the output laser light L2 based on the digital signal. Hereby it is possible to monitor the power of the optical power of the output laser light L2.

The optical fiber laser device 100I is configured to monitor the optical power of the output laser light L2 by making use of the optical power leaking from the wavelength division-multiplexing optical multiplexer/demultiplexer 10 for outputting the visible light L1 from the optical output unit 12. As a result, unnecessary attenuation of the power of the output laser light L2 for processing by the optical loss of an optical component provided for monitoring use is prevented.

Figure 12:
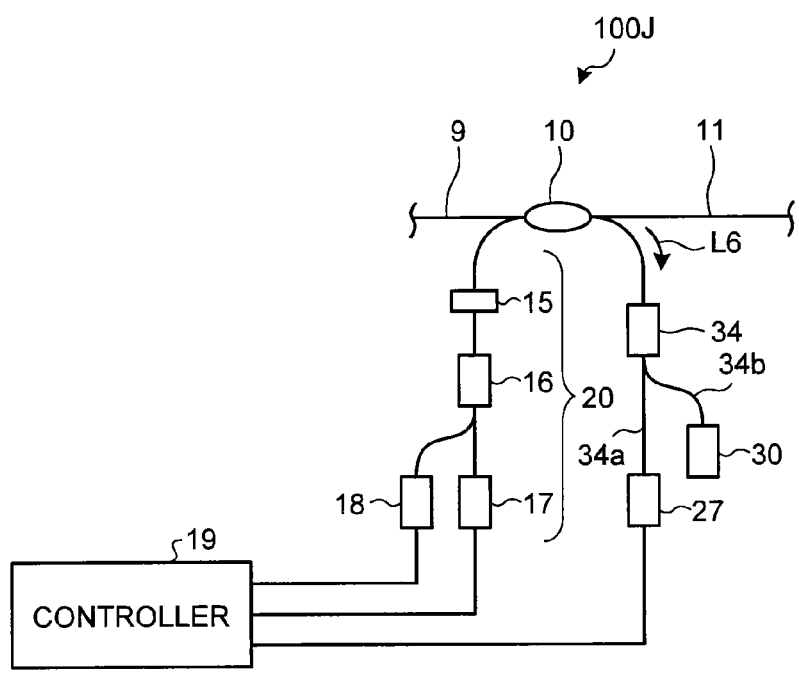
FIG. 12 is a schematic view explaining an essential part of an optical fiber laser device according to a modification example 10 of the embodiment 1.

FIG. 12 is a schematic view explaining an essential part of an optical fiber laser device according to a modification example 10 of the embodiment 1 of the present invention. An optical fiber laser device 100J has a configuration in which, the optical attenuator 26 is replaced with a combination of an optical multiplexer/demultiplexer 34 and the radiator 30 in the optical fiber laser device 100I shown in FIG. 11.

The optical multiplexer/demultiplexer 34 is connected to the terminal T4 of the wavelength division-multiplexing optical multiplexer/demultiplexer 10 (See FIG. 2). The optical multiplexer/demultiplexer 34 is of a kind called Tap coupler which branches a light input from the wavelength division-multiplexing optical multiplexer/demultiplexer 10 side by a greater branch ratio and outputs to a terminal 34a and a terminal 34b. The branch ratio of the optical powers of the terminal 34a and the terminal 34b of the optical multiplexer/demultiplexer 34 according to the present modification example 10 is 1:10000 at a wavelength band of an output laser light. The optical multiplexer/demultiplexer 34 is called a 40-dB coupler. The terminal 34a is connected to the optical detector 27 and the terminal 34b is connected to the radiator 30.

According to the above-described configuration, the optical multiplexer/demultiplexer 34 has characteristics making at least a light at the wavelength of the output laser light L2 be attenuated to a large degree, and has an effect that is substantially the same as that of the optical attenuator 26 of the above-described modification example 9. Hereby the optical fiber laser device 100J according to the modification example 10 has a function and an effect similar to those of the optical fiber laser device 100I according to the modification example 9. Similarly to the above-described modification example 9, it may be configured that the light-emitting-and-light-receiving unit 20 can be replaced with the light-emitting-and-light-receiving units 20A to 20H shown in FIGS. 3 to 10 if it is deemed appropriate.

Figure 13:
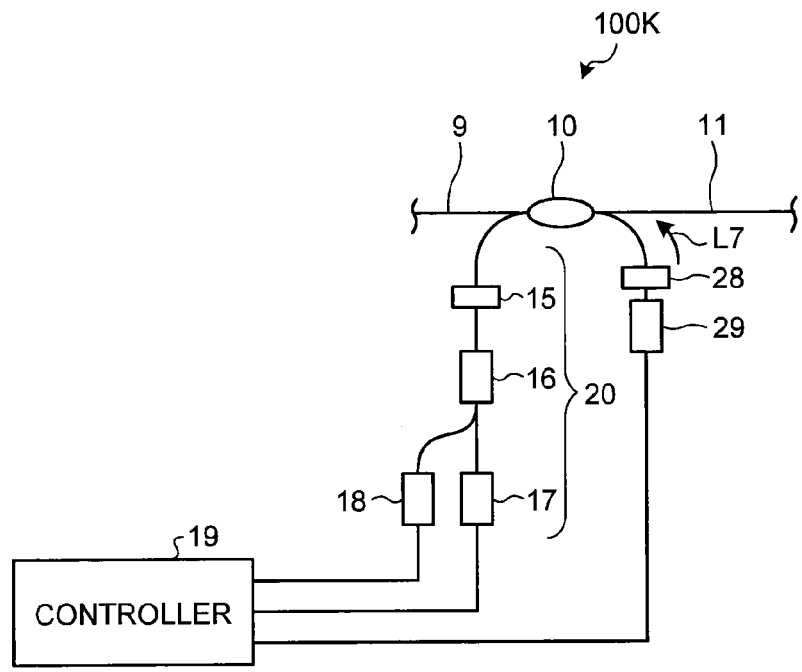
FIG. 13 is a schematic view explaining an essential part of an optical fiber laser device according to a modification example 11 of the embodiment 1.

FIG. 13 is a schematic view explaining an essential part of an optical fiber laser device according to a modification example 11 of the embodiment 1 of the present invention. An optical fiber laser device 100K has a configuration in which the optical attenuator 26 and the optical detector 27 of the optical fiber laser device 100I shown in FIG. 11 are replaced with an optical filter 28 and a visible light LD 29.

Similarly to the visible light LD 17, the visible light LD 29 is configured by a laser diode capable of outputting a visible light L7 such as (for example, wavelength of 638 nm of) a red visible light.

The optical filter 28 has wavelength characteristics by which the visible light L7 is transmitted with low loss and a light at the wavelength of the output laser light L2 is attenuated to a large degree (for example, by 10 dB to 40 dB).

In the optical fiber laser device 100K, the visible light LD 29 is used for fault analysis. That is, in a case where, for example, a fault such as disconnection is considered to occur in the optical fiber 3 the optical reflector 4, the amplification optical fiber 5, the optical reflector 6, the optical fiber 7, the cladding mode removal unit 8, and the optical fiber 9 as an optical path for the laser light, or the wavelength division-multiplexing optical multiplexer/demultiplexer 10, the controller 19 makes the visible light LD 29 output the visible light L7 in a state where operations of both the visible light LD 17 and the pumping LD 13 are stopped. The visible light L7 is input into the optical fiber 9 from the wavelength division-multiplexing optical multiplexer/demultiplexer 10 and propagated in the cladding mode removal unit 8, the optical fiber 7, the optical reflector 6, the amplification optical fiber 5, the optical reflector 4, and the optical fiber 3 in this order. If the optical path is subjected to disconnection, since the visible light L7 leaks from the point of disconnection to outside, the point of disconnection can be specified visually.

Figure 14:
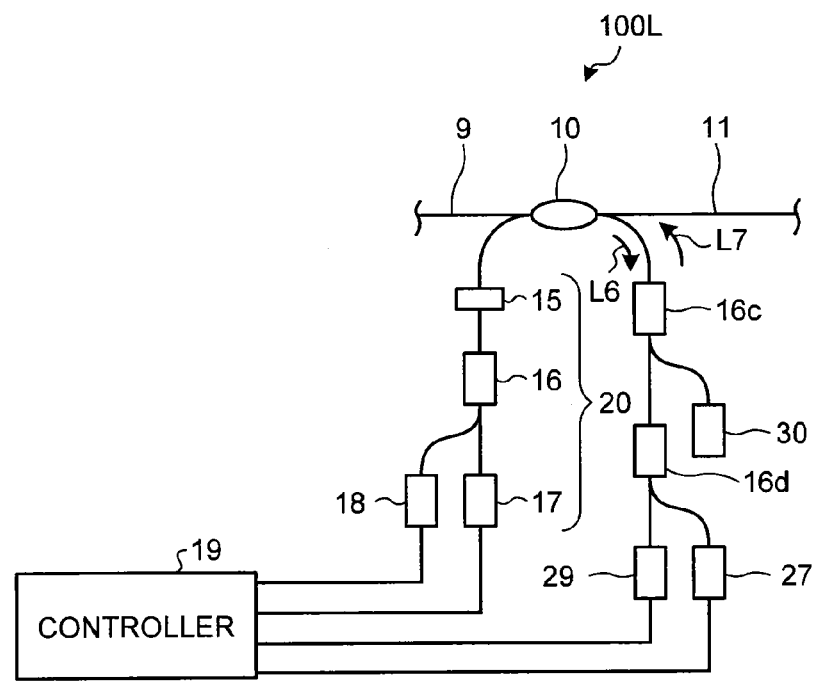
FIG. 14 is a schematic view explaining an essential part of an optical fiber laser device according to a modification example 12 of the embodiment 1.

FIG. 14 is a schematic view explaining an essential part of an optical fiber laser device according to a modification example 12 of the embodiment 1 of the present invention. An optical fiber laser device 100L has a configuration in which, the optical attenuator 26 is replaced with a combination of two wavelength division-multiplexing optical multiplexers/demultiplexers 16c and 16d, the visible light LD 29, and the radiator 30 in the optical fiber laser device 100I shown in FIG. 11.

The wavelength division-multiplexing optical multiplexer/demultiplexer 16c is connected to the terminal T4 of the wavelength division-multiplexing optical multiplexer/demultiplexer 10 (See FIG. 2). The wavelength division-multiplexing optical multiplexer/demultiplexer 16c causes most of the laser light L6 leaking from the terminal T4 of the wavelength division-multiplexing optical multiplexer/demultiplexer 10 to be transmitted to the radiator 30 side. The radiator 30 is a terminator for conducting thermal conversion for the laser light L6 and radiation. The wavelength division-multiplexing optical multiplexer/demultiplexer 16c causes the rest of the laser light L6 leaking from the terminal T4 of the wavelength division-multiplexing optical multiplexer/demultiplexer 10 to be transmitted to the wavelength division-multiplexing optical multiplexer/demultiplexer 16d side.

The wavelength division-multiplexing optical multiplexer/demultiplexer 16d causes most of the laser light L6 input from the wavelength division-multiplexing optical multiplexer/demultiplexer 16c to be transmitted to the optical detector 27 side. On the other hand, the wavelength division-multiplexing optical multiplexer/demultiplexer 16d causes the rest of the laser light L6 input from the wavelength division-multiplexing optical multiplexer/demultiplexer 16c to be transmitted to the visible light LD 29 side.

The optical detector 27 is connected to the wavelength division-multiplexing optical multiplexer/demultiplexer 16d and is connected to the controller 19. The visible light LD 29 is connected to the wavelength division-multiplexing optical multiplexer/demultiplexer 16d and is connected to the controller 19.

According to the above-described configuration, the optical fiber laser device 100L according to the modification example 12 has both the functions of the optical fiber laser device 100I according to the modification example 9 and the function of the optical fiber laser device 100K according to the modification example 11.

That is, since the optical detector 27 receives the laser light L6 leaking from the wavelength division-multiplexing optical multiplexer/demultiplexer 10, unnecessary attenuation of the power of the output laser light L2 for processing by an optical loss in an optical component provided for monitoring the optical power of the output laser light L2 is prevented in the optical fiber laser device 100L. Moreover, in the optical fiber laser device 100L, the visible light L7 output from the visible light LD 29 is used for fault analysis without being attenuated to a large degree by the characteristics of the wavelength division-multiplexing optical multiplexers/demultiplexers 10, 16c, and 16d, and on the other hand, a possibility of damaging the visible light LD 29 is very little since the laser light L6 leaking from the wavelength division-multiplexing optical multiplexer/demultiplexer 10 and reaching the visible light LD 29 is attenuated to a large degree.

Similarly to the above-described modification example, it may be configured that the light-emitting-and-light-receiving unit 20 shown in FIG. 14 is replaced with the light-emitting-and-light-receiving units 20A to 20H shown in FIGS. 3 to 10 if it is deemed appropriate. Alternatively, an element may be omitted in the configuration of the light-emitting-and-light-receiving units 20A to 20H shown in FIG. 3 to 10 or an additional element may replace with the light-emitting-and-light-receiving unit 20 in accordance with usage if it is deemed appropriate.

Meanwhile, the return light L3 includes a Raman-scattered light produced in the optical fiber 11 or the like sometimes. The power of the Raman-scattered light increases drastically along with an increase in the power of the output laser light L2. The energy of the Raman-scattered light causes a so called "fiber fuse" to occur in which the core of an optical fiber is subjected to irreversible thermal change, and may damage the optical fiber laser device.

By contrast, the optical fiber laser device according to a modification example 13 of the embodiment 1 of the present invention is capable of monitoring a ratio of a Raman-scattered light included in the return light L3 relative to the return light of the output laser light L2 to stop driving the pumping LD 13 or reduce an electric current for driving the pumping LD 13 when the ratio is equal to or greater than a predetermined set value.

Figure 15:
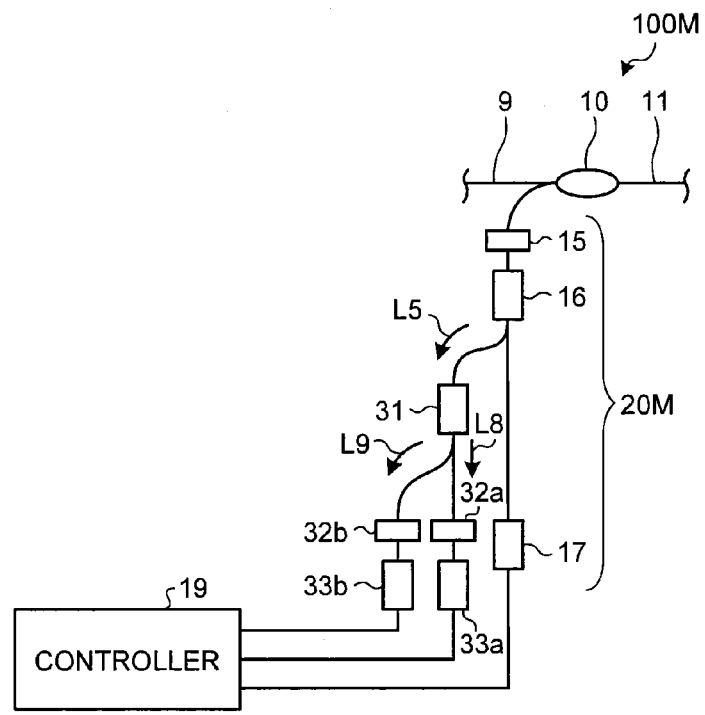
FIG. 15 is a schematic view explaining an essential part of an optical fiber laser device according to a modification example 13 of the embodiment 1.

FIG. 15 is a schematic view explaining an essential part of an optical fiber laser device according to a modification example 13 of the embodiment 1 of the present invention. An optical fiber laser device 100M has a configuration in which the light-emitting-and-light-receiving unit 20 of the optical fiber laser device 100 shown in FIG. 1 is replaced with a light-emitting-and-light-receiving unit 20M.

The light-emitting-and-light-receiving unit 20M has a configuration in which the optical detector 18 of the light-emitting-and-light-receiving unit 20 is replaced with a wavelength division-multiplexing optical multiplexer/demultiplexer 31, optical filters 32a and 32b, and optical detectors 33a and 33b which are as an optical detector.

The wavelength division-multiplexing optical multiplexer/demultiplexer 31 is connected to the wavelength division-multiplexing optical multiplexer/demultiplexer 16. The wavelength division-multiplexing optical multiplexer/demultiplexer 31 has a function of separating a light L8 including a Raman-scattered light (of which wavelength is, for example, 1140 nm) which can be included in the leaking return light L5, from a light L9 including a return light at the wavelength of the output laser light L2 (of which wavelength is, for example, 1080 nm) including a return light and outputting these lights.

The optical filters 32a and 32b are connected to the wavelength division-multiplexing optical multiplexer/demultiplexer 31. The optical filter 32a has characteristics of further transmitting a light having a wavelength component of wavelength of 1140 nm from the light L8 separated and output by the wavelength division-multiplexing optical multiplexer/demultiplexer 31. The optical filter 32b has characteristics of further transmitting a light having a wavelength component of wavelength of 1080 nm from the light L9 separated and output from the wavelength division-multiplexing optical multiplexer/demultiplexer 31.

The optical detectors 33a and 33b are connected to the optical filters 32a and 32b respectively, and are connected to the controller 19. The optical detectors 33a and 33b have configurations capable of receiving a light, transmitted by the optical filter 32a, of which wavelength component is wavelength of 1140 nm and a light, transmitted by the optical filter 32b, of which wavelength component is wavelength of 1080 nm respectively, and outputting an electric current signal corresponding to their powers of the received lights. The optical detectors 33a and 33b are configured by, for example, photo-diodes.

The CPU of the controller 19 calculates a ratio of a light of which wavelength component is a wavelength of 1140 nm (Raman-scattered light) relative to a light of which wavelength component is a wavelength of 1080 nm (the return light of the output laser light L2) based on the electric current signals from the optical detectors 33a and 33b. Hereby it is possible to monitor the ratio of the Raman-scattered light relative to the return light of the output laser light L2.

The CPU compares the calculated ratio with data stored by the ROM, and if the ratio is equal to or greater than a certain set value, the CPU is capable of reducing a pumping-light output by stopping driving the pumping LD 13 or reducing a current for driving the pumping LD 13 for preventing the optical fiber laser device 100M from being damaged by the Raman-scattered light.

Figure 16:
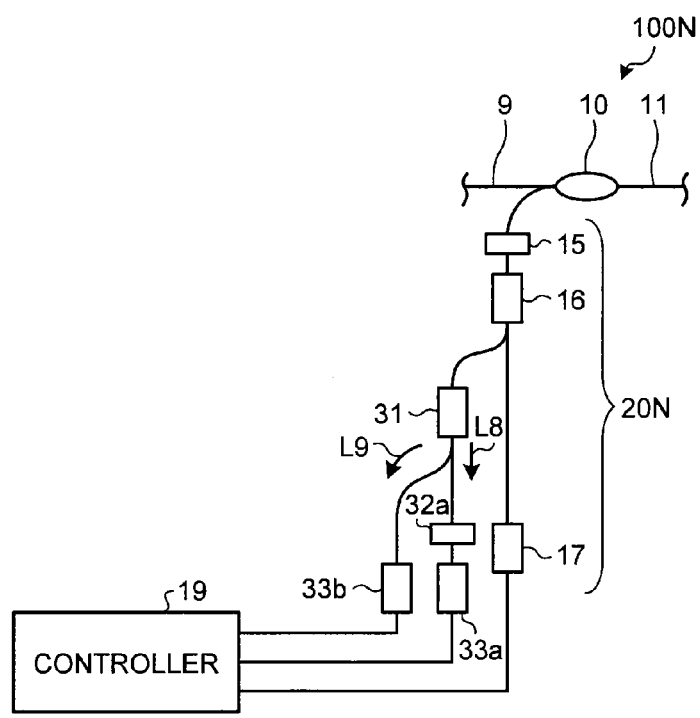
FIG. 16 is a schematic view explaining an essential part of an optical fiber laser device according to a modification example 14 of the embodiment 1.

FIG. 16 is a schematic view explaining an essential part of an optical fiber laser device according to a modification example 14 of the embodiment 1 of the present invention. An optical fiber laser device 100N has a configuration in which the light-emitting-and-light-receiving unit 20M of the optical fiber laser device 100M shown in FIG. 15 is replaced with a light-emitting-and-light-receiving unit 20N.

The light-emitting-and-light-receiving unit 20N has a configuration in which the optical filter 32b is deleted from the light-emitting-and-light-receiving unit 20M.

The optical fiber laser device 100N calculates the ratio of the Raman-scattered light relative to the return light of the output laser light L2 based on the power of the light L8 of which wavelength component is a wavelength of 1140 nm received by the optical detector 33a and the power of the light L9 being received by the optical detector 33b and including the return light of the output laser light L2. Hereby it is possible to monitor the ratio of the Raman-scattered light relative to the return light of the output laser light L2.

As a modification example of the light-emitting-and-light-receiving unit 20N, it may be configured in which the optical filter 32a is deleted from the light-emitting-and-light-receiving unit 20M.

Figure 17:
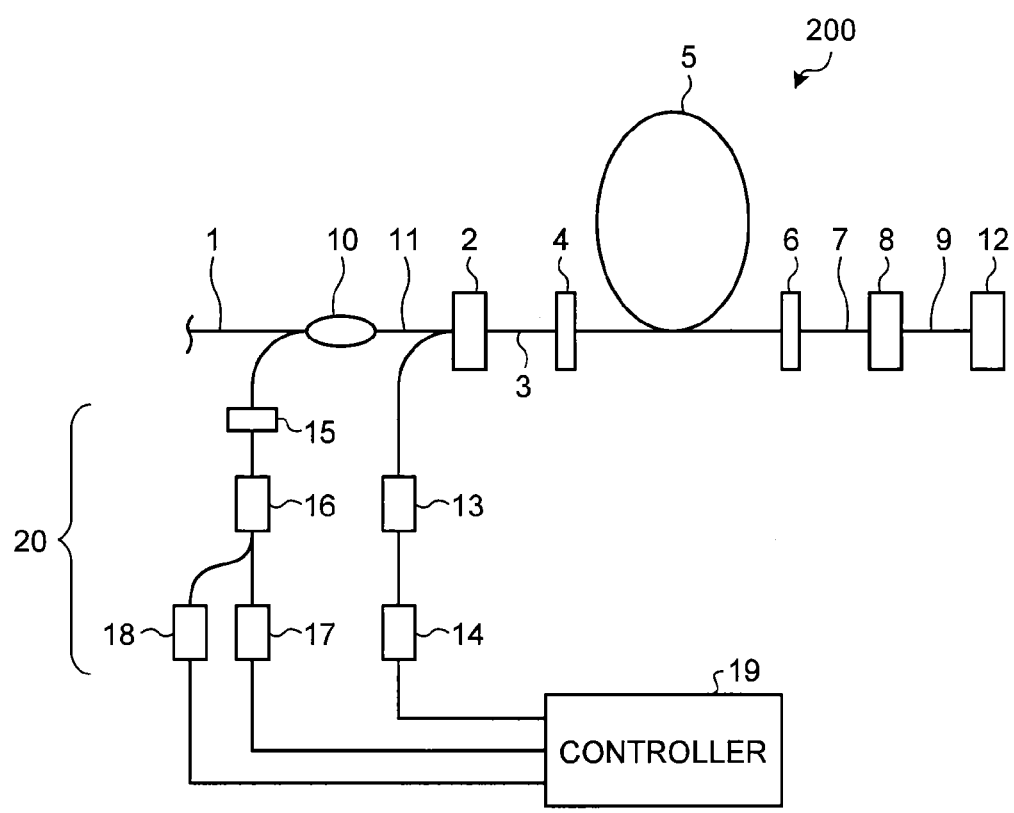
FIG. 17 is a schematic view of an optical fiber laser device according to an embodiment 2.

FIG. 17 is a schematic view of an optical fiber laser device according to an embodiment 2 of the present invention. An optical fiber laser device 200 has a configuration in which, in the optical fiber laser device 100 shown in FIG. 1, the wavelength division-multiplexing optical multiplexer/demultiplexer 10 and the optical fiber 11 are moved and disposed between the optical fiber 1 and the pumping-light multiplexer 2, and the optical fiber 9 as an output optical fiber is connected to the optical output unit 12.

As explained for the optical fiber laser device 200, the position at which the wavelength division-multiplexing optical multiplexer/demultiplexer 10 will be disposed is not limited to an output side of the amplification optical fiber 5, and a similar effect to that of the optical fiber laser device 100 can be obtained even if the wavelength division-multiplexing optical multiplexer/demultiplexer 10 is disposed at an input side. It is preferable that the visible light output from the visible light LD 17 be higher in optical power, to a degree that the visible light is visually recognized when being irradiated to the workpiece, since the visible light is subjected to more optical loss until being output from the optical output unit 12 than in a case of the optical fiber laser device 100.

The light-emitting-and-light-receiving unit 20 of the optical fiber laser device 200 may be replaced with the light-emitting-and-light-receiving units 20A to 20N shown in FIGS. 3 to 16 if it is deemed appropriate.

Figure 18:
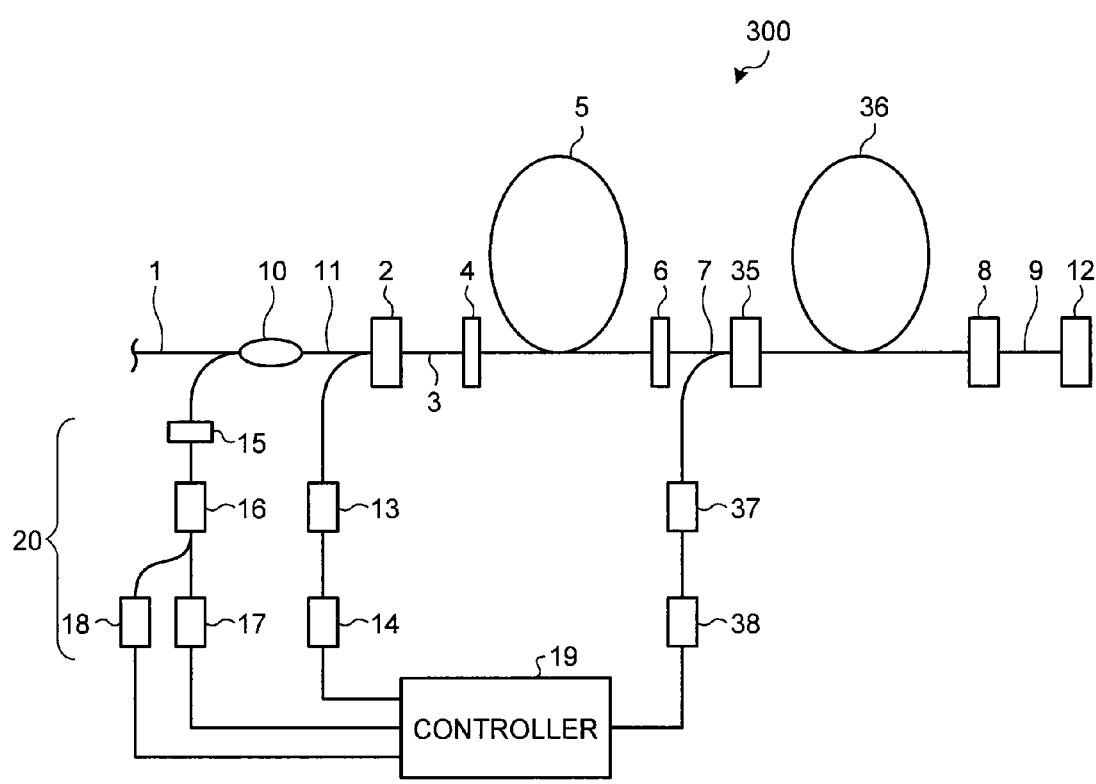
FIG. 18 is a schematic view of an optical fiber laser device according to an embodiment 3.

FIG. 18 is a schematic view of an optical fiber laser device according to an embodiment 3 of the present invention. An optical fiber laser device 300 has a configuration in which, in the optical fiber laser device 200 shown in FIG. 17, a pumping-light multiplexer 35 and an amplification optical fiber 36 are further inserted between the optical fiber 7 and the cladding mode removal unit 8, and a pumping LD 37 and a pumping-LD-driving power source 38 are connected to the pumping-light multiplexer 35 in this order. The pumping-light multiplexer 35, the amplification optical fiber 36, the pumping LD 37, and the pumping-LD-driving power source 38 have similar configurations that correspond to those of the pumping-light multiplexer 2, the amplification optical fiber 5, the pumping LD 13, and the pumping-LD-driving power source 14 respectively.

The optical fiber laser device 300 has a master oscillator and power amplifier (MOPA) structure and is provided with the amplification optical fiber 36 and the pumping LD 37 for pumping the amplification optical fiber 36; and thus capable of outputting the output laser light L2 in a higher power from the optical output unit 12.

Figure 19:
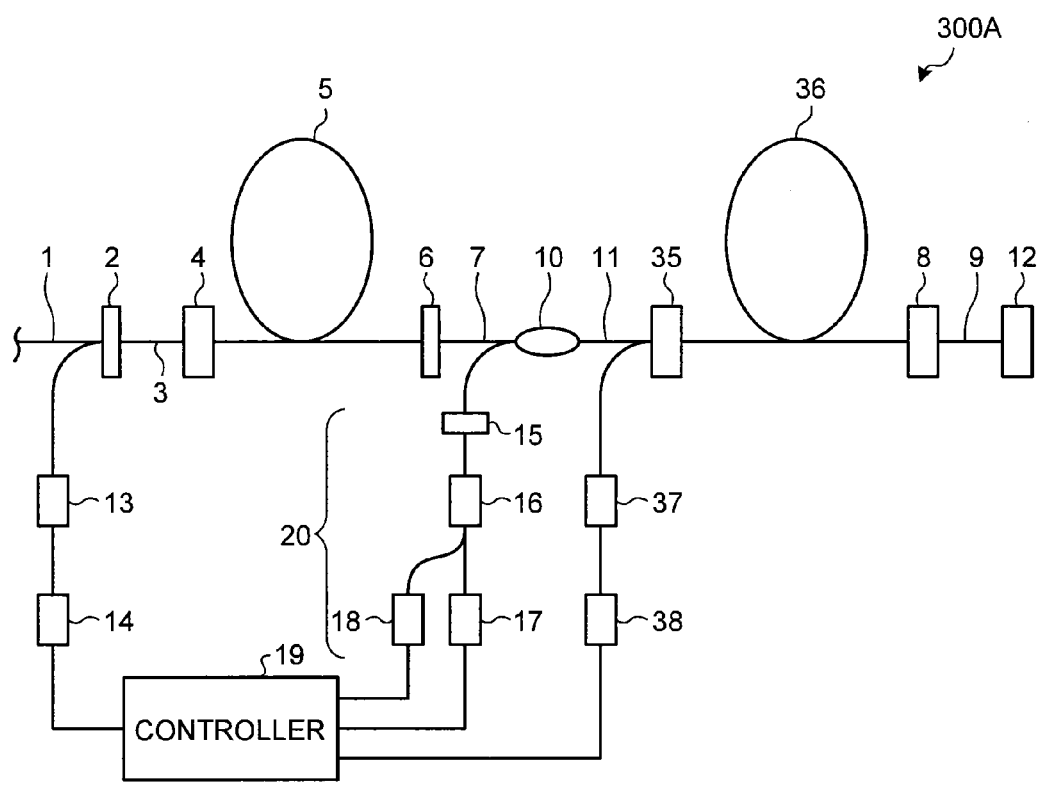
FIG. 19 is a schematic view of an optical fiber laser device according to an embodiment 4.

FIG. 19 is a schematic view of an optical fiber laser device according to an embodiment 4 of the present invention. An optical fiber laser device 300A has a configuration in which, in the optical fiber laser device 300 shown in FIG. 18, the wavelength division-multiplexing optical multiplexer/demultiplexer 10 and the optical fiber 11 are moved and disposed between the optical fiber 7 and the pumping-light multiplexer 35. As described above, the wavelength division-multiplexing optical multiplexer/demultiplexer 10 may be disposed between the two amplification optical fibers 5 and 36.

In the optical fiber laser device 300A, the wavelength division-multiplexing optical multiplexer/demultiplexer 10 and the optical fiber 11 may be moved and disposed between the optical fiber 9 and the optical output unit 12. The light-emitting-and-light-receiving unit 20 in the optical fiber laser devices 200, 300, and 300A may be replaced with the light-emitting-and-light-receiving units 20A to 20N shown in FIGS. 3 to 16 if it is deemed appropriate. A multi-stage optical fiber laser device may be configured by adding the pumping-light multiplexer 35, the amplification optical fiber 36, the pumping LD 37, and the pumping-LD-driving power source 38 to the optical fiber laser devices 300 and 300A.

Figure 20:
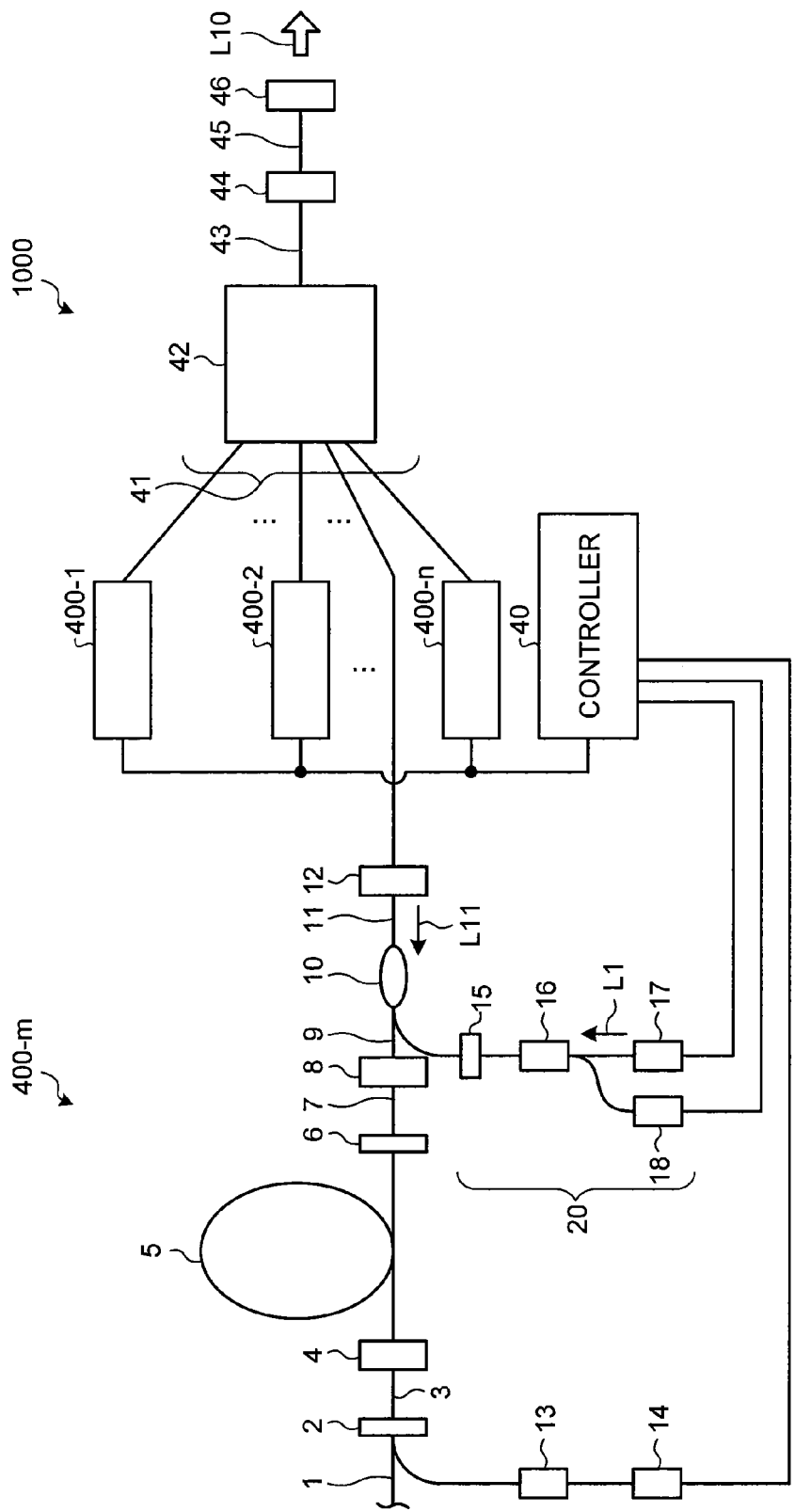
FIG. 20 is a schematic view of an optical fiber laser device according to an embodiment 5.

FIG. 20 is a schematic view of an optical fiber laser device according to an embodiment 5. An optical fiber laser device 1000 has a configuration in which optical fiber laser units 400-1 to 400-n (n is an integer equal to or greater than 2), a plurality of optical fibers 41, an optical multiplexer 42, an optical fiber 43, a cladding mode removal unit 44, an optical fiber 45 as an output optical fiber, and an optical output unit 46 are connected in this order.

The optical fiber laser units 400-1 to 400-n have configurations in which the wavelength division-multiplexing optical multiplexer/demultiplexer 10, the light-emitting-and-light-receiving unit 20, and the controller 19 are deleted from the optical fiber laser device 100 according to the embodiment 1 shown in FIG. 1. However, as shown in FIG. 20, the optical fiber laser unit 400-m (m is an integer equal to or greater than 1 and equal to or smaller than n) has a configuration in which the controller 19 is deleted from the optical fiber laser device 100. That is, the optical fiber laser unit 400-m is provided with the wavelength division-multiplexing optical multiplexer/demultiplexer 10 and the light-emitting-and-light-receiving unit 20.

The controller 40 is a controller commonly connected to each of the power sources 14 for driving the pumping LD of the optical fiber laser units 400-1 to 400-n, and the visible light LD 17 and the optical detector 18 of the optical fiber laser unit 400-m.

The optical multiplexer 42 is configured by, for example, a TFB or the like. The optical fibers 41 are optical fibers introducing laser lights output from each of the optical output units 12 of the optical fiber laser units 400-1 to 400-n to a plurality of input terminals of the optical multiplexer 42 respectively. Each optical fiber 41 is configured by a single-mode optical fiber or a multi-mode optical fiber according to the amplification optical fiber 5. The optical multiplexer 42 multiplexes the laser lights output from the optical fiber laser units 400-1 to 400-n respectively and outputs to the optical fiber 43 from an output terminal.

The optical fiber 43 is a multi-mode optical fiber connected to an output terminal of the optical multiplexer 42. The cladding mode removal unit 44 has a function of removing a light propagating in an inner cladding of the optical fiber 43 and can be configured similarly to the cladding mode removal unit 8 shown in FIG. 1.

The optical fiber 45 is configured by a multi-mode optical fiber. The optical output unit 46 is configured by, for example, an optical connector. The optical output unit 46 outputs the laser lights, from each of the optical fiber laser units 400-1 to 400-n, multiplexed by the optical multiplexer 42 as an output laser light L10.

Hereafter an operation of the optical fiber laser device 1000 will be explained. Prior to processing of the workpiece, the controller 40 is in a state of stopping operations of both the visible light LD 17 and the pumping LD 13 for pumping each of the optical fiber laser units 400-1 to 400-n. In this state, when the workpiece is mounted on a workpiece stand not shown in the drawing and an operation for determining a position at which the visible light L1 will be irradiated is conducted, the CPU of the controller 40 detects the operation via the I/F. The CPU executes a process of positioning based on a program stored in the ROM. To be more specific, the CPU obtains control data from data, conducts D/A conversion by the I/F, and then supplies to the visible light LD 17 based on the program. As a result, the visible light LD 17 outputs the visible light L1. The visible light L1 passes through the wavelength division-multiplexing optical multiplexer/demultiplexer 16, the optical filter 15, the wavelength division-multiplexing optical multiplexer/demultiplexer 10, the optical fiber 11, the optical output unit 12, the optical fiber 41, the optical multiplexer 42, the optical fiber 43, the cladding mode removal unit 44, and the optical fiber 45, and is output from the optical output unit 46, and then irradiated to a position at which the workpiece will be processed (a position at which the visible light L1 is irradiated). Hereby the positioning is conducted for determining the position at which the output laser light L10 will be irradiated.

When the positioning is completed, the controller 40 stops irradiation from the visible light LD 17. Hereby the irradiation of the visible laser light to the workpiece is stopped. Then, when an instruction of starting processing, the CPU obtains data for driving each pumping LD 13 from the data being stored in the ROM and corresponding to the irradiation power, and then supplies to the I/F. The I/F conducts D/A conversion of the supplied data for driving, and supplies to each pumping-LD-driving power source 14. Each pumping-LD-driving power source 14 drives each pumping LD 13 in accordance with instruction value supplied from the I/F. Hereby each of the optical fiber laser units 400-1 to 400-n starts laser oscillation, and in the end, the output laser light L10 is irradiated to the workpiece.

Herein the visible light L1 and the output laser light L10 pass the common optical fiber 45 and are output from the optical output unit 46. Therefore, the position at which the output laser light L10 will be irradiated is the same as the position at which the visible light L1 is irradiated. Hereby the optical fiber laser device 1000 is capable of accurate processing by the output laser light L10 at the position accurately positioned by the visible light L1.

A return light L11 which is a part of the output laser light L10 reflected or scattered by the workpiece and returned therefrom reaches the wavelength division-multiplexing optical multiplexer/demultiplexer 10, a part of the return light L11 leaks to the optical filter 15 side at the wavelength division-multiplexing optical multiplexer/demultiplexer 10 similarly to the case of the embodiment 1. A part of the leaking return light is used for monitoring the return light L11 by the light-emitting-and-light-receiving unit 20.

The present embodiment 5 is configured to monitor the optical power of the return light L11 by making use of the return light leaking from the wavelength division-multiplexing optical multiplexer/demultiplexer 10 for outputting the visible light L1 from the optical output unit 12. As a result, unnecessary attenuation of the power of the output laser light L10 for processing because of the optical loss in the optical component provided for monitoring use is prevented.

As described above, the optical fiber laser device 1000 according to the present embodiment 5 is capable of more accurate positioning for the irradiation position of the laser light and monitoring the return light while restraining the attenuation of the power of the laser light for processing.

In the present embodiment 5, the optical fiber laser unit provided with the wavelength division-multiplexing optical multiplexer/demultiplexer 10 and the light-emitting-and-light-receiving unit 20 is one of the optical fiber laser units 400-1 to 400-$n$, i.e., the optical fiber laser unit 400-$m$. Alternatively, a plurality of, or all the optical fiber laser units may be provided with the wavelength division-multiplexing optical multiplexer/demultiplexer 10 and the light-emitting-and-light-receiving unit 20.

Figure 21:
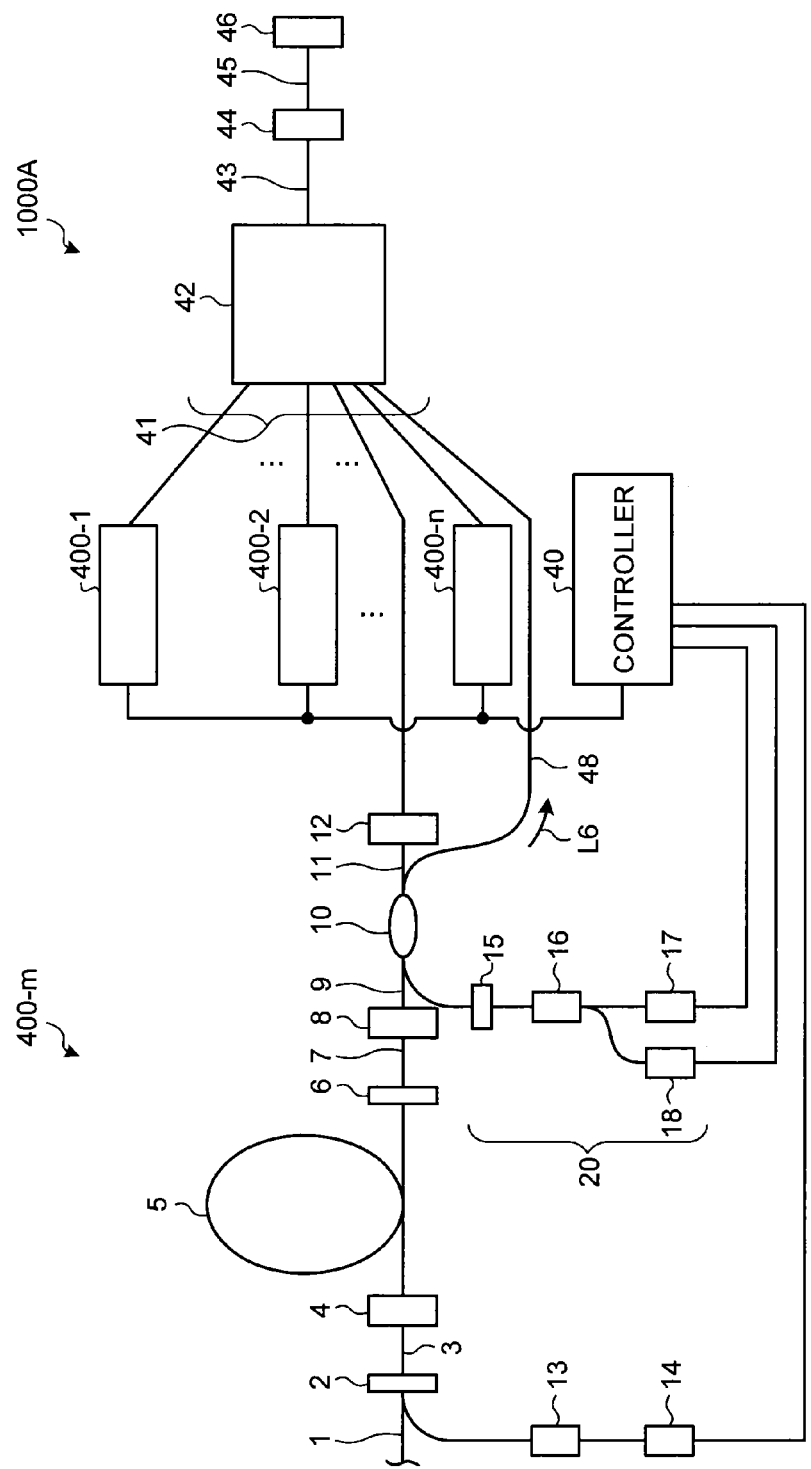
FIG. 21 is a schematic view of an optical fiber laser device according to a modification example of the embodiment 5.

FIG. 21 is a schematic view of an optical fiber laser device according to a modification example of the embodiment 5. An optical fiber laser device 1000A has a configuration in which, in the optical fiber laser device 1000 shown in FIG. 20, the terminal T4 of the wavelength division-multiplexing optical multiplexer/demultiplexer 10 and an unused input terminal, which is one of the input terminals of the optical multiplexer 42 and to which the optical fiber laser units 400-1 to 400-$n$ are not connected, are connected by an optical fiber 48. The optical fiber 48 may have a configuration similar to that of the optical fiber 41.

In the optical fiber laser device 1000A, the laser light L6 output from the terminal T4 by the wavelength division-multiplexing optical multiplexer/demultiplexer 10 is input to an unused input terminal of the optical multiplexer 42 through the optical fiber 48 and is multiplexed by the optical multiplexer 42 with laser lights output from the optical fiber laser units 400-1 to 400-$n$, and is output as the output laser light L10 finally. As a result, a laser light output from the terminal T4, which has not been used conventionally, can be used effectively, and thus the output laser light L10 can be intensified to a higher degree.

In the present modification example, the optical fiber laser unit provided with the wavelength division-multiplexing optical multiplexer/demultiplexer 10 and the light-emitting-and-light-receiving unit 20 is one of the optical fiber laser units 400-1 to 400-$n$, i.e., the optical fiber laser unit 400-$m$. Alternatively, a plurality of, or all the optical fiber laser units may be provided with the wavelength division-multiplexing optical multiplexer/demultiplexer 10 and the light-emitting-and-light-receiving unit 20. In this case, it may be configured in which the laser light output from the terminal T4 of each wavelength division-multiplexing optical multiplexer/demultiplexer 10 is input into each unused input terminal of the optical multiplexer 42.

Figure 22:
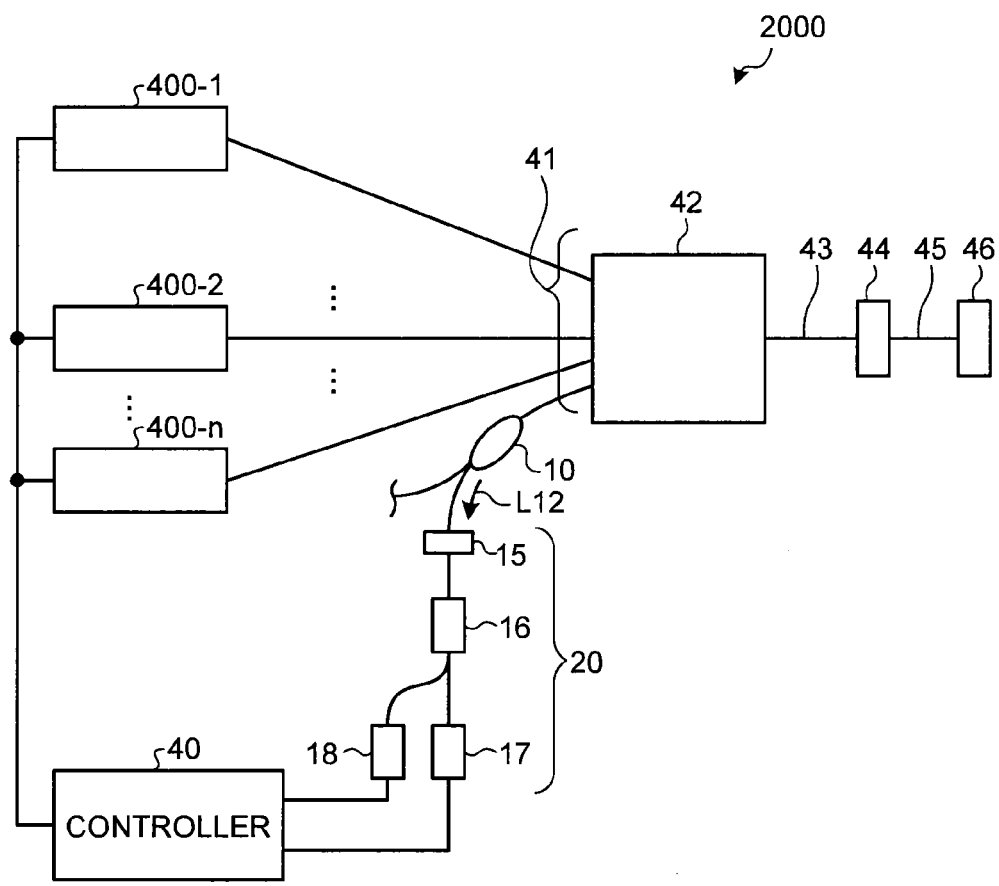
FIG. 22 is a schematic view of an optical fiber laser device according to an embodiment 6.

FIG. 22 is a schematic view of an optical fiber laser device according to an embodiment 6. In an optical fiber laser device 2000, the wavelength division-multiplexing optical multiplexer/demultiplexer 10 and the light-emitting-and-light-receiving unit 20 are connected to an unused input terminal of the optical multiplexer 42 which is not connected to the optical fiber laser units 400-1 to 400-$n$.

A part of a return light which is a part of the output laser light L10 and includes a reflected light or a scattered light from the workpiece or a Raman-scattered light is output by the wavelength division-multiplexing optical multiplexer/demultiplexer 10 to the optical filter 15 side as a leaking return light L12. The output leaking return light L12 is used for monitoring of the return light by the light-emitting-and-light-receiving unit 20.

In the optical fiber laser device 2000, one of, or a plurality of, the optical fiber laser units 400-1 to 400-$n$, optical fiber laser units also may be provided with the wavelength division-multiplexing optical multiplexer/demultiplexer 10 and the light-emitting-and-light-receiving unit 20.

Figure 23:
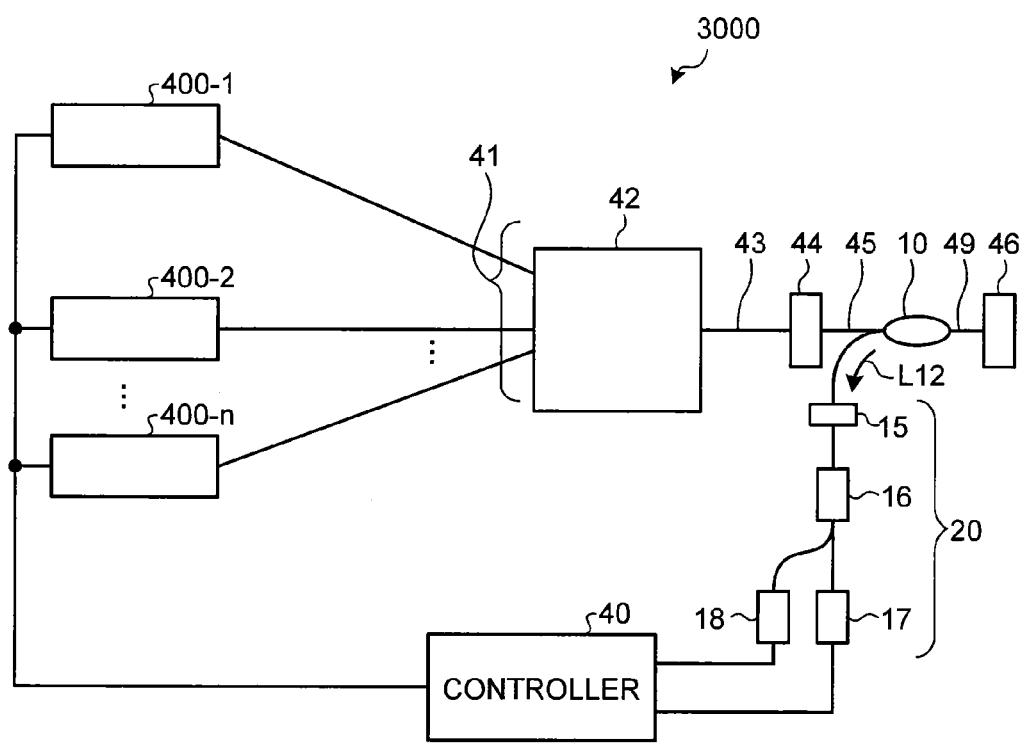
FIG. 23 is a schematic view of an optical fiber laser device according to an embodiment 7.

FIG. 23 is a schematic view of an optical fiber laser device according to an embodiment 7. An optical fiber laser device 3000 has a configuration in which, in the optical fiber laser device 2000 shown in FIG. 22, the wavelength division-multiplexing optical multiplexer/demultiplexer 10 is moved and disposed between the optical fiber 45 and the optical output unit 46, and an optical fiber 49 is added as an output optical fiber. The optical fiber 49 can be configured to be similar to that of the optical fiber 45.

As explained for the optical fiber laser device 3000, the wavelength division-multiplexing optical multiplexer/demultiplexer 10 may be disposed at an output side of the optical multiplexer 42.

The light-emitting-and-light-receiving unit 20 of the optical fiber laser devices 1000, 1000A, 2000, and 3000 according to the embodiments 5 to 7 can be replaced with the light-emitting-and-light-receiving units 20A to 20N shown in FIGS. 3 to 6 if it is deemed appropriate. In a case of adapting it to the optical fiber laser device 2000, the optical filter 15 of the light-emitting-and-light-receiving unit 20C, the optical attenuator 23 of the light-emitting-and-light-receiving unit 20F, and the optical filter 15 of the light-emitting-and-light-receiving unit 20G may be deleted if it is deemed appropriate.

Although the optical fiber laser device in the above-described embodiments has a so called forward pumping type of configuration in which a direction of the pumping light propagating in the amplification optical fibers 5 and 36 from the pumping LDs 13 and 37 coincides with a direction of the output laser light, a known backward pumping type or bidirectional pumping type of configuration may be adapted.

Although the red visible laser light is used as the visible lights L1 and L7 in the above-described embodiment, for example, a more visible green visible laser light may be used.

Although the pumping LD is configured to be driven by the pumping-LD-driving power source in the above-described embodiments, it may be configured that the controllers 19 and 40 drive each pumping LD directly. It may be configured that a field effect transistor (FET) is controlled based on a control signal from the controller to control an electric current flowing in each pumping LD.

A multi-stage optical fiber laser device may be configured by adding the pumping-light multiplexer 35, the amplification optical fiber 36, the pumping LD 37, and the pumping-LD-driving power source 38 to the optical fiber laser devices according to the above-described embodiment 1 and each modification example thereof similarly to the optical fiber laser device 300.

Other than the "fused type" of wavelength division-multiplexing optical multiplexer/demultiplexer used in the above-described embodiments, for example, a "polished type" of wavelength division-multiplexing optical multiplexer/demultiplexer may be used which is configured by, for example, removing claddings of two optical fibers partly by polishing or the like and making cores close to each other. In a case of using such a polished type of wavelength division-multiplexing optical multiplexer/demultiplexer, also an effect similar to that of the fused type can be obtained.

As the wavelength division-multiplexing optical multiplexer/demultiplexer, a configuration by an spatial coupling system in which a dielectric multilayer filter is sandwiched by fiber collimators may be used. Since the "fused type" and the "polished type" can be configured without being through the spatial coupling system, tolerance for the optical power becomes stronger.

Although the above-described embodiments use the wavelength division-multiplexing optical multiplexer/demultiplexer as an introduction unit, a Tap coupler may be used.

As described above, the optical fiber laser device according to the present invention is suitable as an optical fiber laser device for processing.

The present invention is not limited to the above-described embodiments. The above-described respective elements combined appropriately are included in the present invention.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical fiber laser device comprising:
   an amplification optical fiber;
   a pumping light source outputting a pumping light making the amplification optical fiber be subjected to optical pumping;
   optical reflectors being disposed at two sides of the amplification optical fiber and configuring an optical resonator making laser oscillation of an invisible laser light from a light generated in the amplification optical fiber;
   an output optical fiber guiding the laser light and outputting the laser light to outside;
   a first visible light source outputting a visible light;
   an introduction unit having at least first and second input terminals and a first output terminal, the introduction unit having wavelength characteristics of outputting the laser light input to the first input terminal from the first output terminal mainly and outputting the visible light input to the second input terminal from the first output terminal mainly, the introduction unit making the visible light output by the first visible light source input from the second input terminal and introducing the visible light to the amplification optical fiber or the output optical fiber via the first output terminal;
   an optical multiplexer/demultiplexer connected to the first visible light source and connected to the second input terminal of the introduction unit, the visible light output by the first visible light source being input to the optical multiplexer/demultiplexer, the visible light being output to the introduction unit, the optical multiplexer/demultiplexer outputting a leaking return light input from a side of the introduction unit; and
   a controller driving the first visible light source to output the visible light from the output optical fiber in a case of determining a position on a workpiece, at which the laser light will be irradiated.

2. The optical fiber laser device according to claim 1, further comprising an optical detector being connected to the optical multiplexer/demultiplexer and detecting the leaking return light input to the optical detector.

3. The optical fiber laser device according to claim 2, wherein the optical multiplexer/demultiplexer has wavelength characteristics of transmitting the visible light output by the first visible light source to the side of the introduction unit mainly and outputting the leaking return light to the optical detector mainly.

4. The optical fiber laser device according to claim 2, wherein the optical multiplexer/demultiplexer has optical-branching characteristics of outputting the leaking return light to the first visible light source and the optical detector respectively at a predetermined branch ratio.

5. The optical fiber laser device according to claim 2, further comprising an optical attenuator being disposed between the optical multiplexer/demultiplexer and the optical detector and attenuating the leaking return light mainly.

6. The optical fiber laser device according to claim 2, wherein the controller stops the pumping light source or reduces a pumping-light output in a case where a power of the detected leaking return light is equal to or greater than a first value or equal to or smaller than a second value.

7. The optical fiber laser device according to claim 2, wherein the optical detector is configured to separate the leaking return light to a plurality of wavelength components and detecting an optical power of each wavelength component.

8. The optical fiber laser device according to claim 7, wherein the controller stops the pumping light source or reduces the pumping-light output in a case where a ratio of powers of the respective detected wavelength components is equal to or greater than a predetermined value.

9. The optical fiber laser device according to claim 1, further comprising an optical filter being disposed between the introduction unit and the optical multiplexer/demultiplexer, and having wavelength characteristics of transmitting the visible light therethrough mainly and attenuating the leaking return light mainly.

10. The optical fiber laser device according to claim 1, further comprising an optical filter being disposed between the optical multiplexer/demultiplexer and the first visible light source, and having wavelength characteristics of transmitting the visible light therethrough mainly and attenuating the leaking return light mainly.

11. The optical fiber laser device according to claim 1, wherein
   the introduction unit further includes a second output terminal outputting the visible light from the first input terminal mainly in a case where the visible light is input to the second output terminal, and
   the second output terminal is provided with at least one of a second visible light source and a second optical detector.

12. The optical fiber laser device according to claim 1, further comprising:
   a plurality of the amplification optical fibers and a plurality of the pumping light sources and the optical reflectors corresponding to the amplification optical fibers; and
   an optical multiplexer including a plurality of input terminals into which a plurality of the laser lights are input from the plurality of the amplification optical fibers and an output terminal multiplexing the plurality of laser lights and outputting the multiplexed laser lights to the output optical fiber.

13. The optical fiber laser device according to claim 12, wherein the first output terminal of the introduction unit is connected to an unused one of the input terminals of the optical multiplexer.

14. The optical fiber laser device according to claim 12, wherein
   the introduction unit further includes a second output terminal capable of outputting the visible light from the first input terminal mainly in a case where the visible light is input to the introduction unit, and the second output terminal is connected to an unused one of the input terminals of the optical multiplexer.

15. The optical fiber laser device according to claim 1, wherein the introduction unit is of a fiber-fused type or a polished type.

16. The optical fiber laser device according to claim 1, wherein a wavelength of the visible light has a wavelength corresponding to a red color or a green color.

17. The optical fiber laser device according to claim 1, further comprising a radiator being connected to the optical multiplexer/demultiplexer, converting the leaking return light, which is input to the radiator, to heat, and radiating the heat.

* * * * *